Jan. 27, 1959 B. W. KOEPPEL 2,871,474

RADIO LOCATION SYSTEM

Filed Oct. 16, 1956 9 Sheets-Sheet 1

Inventor
BEVERLY W. KOEPPEL
by
Mason, Kolehmainen, Rathburn and Wyss.
Attorneys

Jan. 27, 1959 B. W. KOEPPEL 2,871,474

RADIO LOCATION SYSTEM

Filed Oct. 16, 1956 9 Sheets-Sheet 2

Inventor

BEVERLY W. KOEPPEL by Mason, Kolehmainen, Rathburn and Wyss.

Attorneys

Inventor
BEVERLY W. KOEPPEL
by Mason, Kolehmainen, Rathburn and Wyss.
Attorneys

Jan. 27, 1959 B. W. KOEPPEL 2,871,474

RADIO LOCATION SYSTEM

Filed Oct. 16, 1956 9 Sheets-Sheet 4

Inventor
BEVERLY W. KOEPPEL
by
Mason, Kolehmainen, Rathburn and Wyss
Attorneys

Inventor
BEVERLY W. KOEPPEL
by
Mason, Kolehmainen, Rathburn and Wyss
Attorneys

Jan. 27, 1959 B. W. KOEPPEL 2,871,474

RADIO LOCATION SYSTEM

Filed Oct. 16, 1956 9 Sheets-Sheet 6

Inventor

BEVERLY W. KOEPPEL by Mason, Kolehmainen, Rathburn and Wyss.

Attorneys

Inventor
BEVERLY W. KOEPPEL
by
Mason, Kolehmainen, Rathburn and Wyss
Attorneys

Inventor
BEVERLY W. KOEPPEL
by Mason, Kolehmainen, Rathburn and Wyss.
Attorneys

Jan. 27, 1959 B. W. KOEPPEL 2,871,474

RADIO LOCATION SYSTEM

Filed Oct. 16, 1956 9 Sheets-Sheet 9

Inventor
BEVERLY W. KOEPPEL
by Mason, Kolehmainen, Rathburn and Wyss.
Attorneys

United States Patent Office 2,871,474

Patented Jan. 27, 1959

2,871,474

RADIO LOCATION SYSTEM

Beverly W. Koeppel, Tulsa, Okla., assignor to Seismograph Service Corporation, Tulsa, Okla., a corporation of Delaware Application October 16, 1956, Serial No. 616,215

25 Claims. (Cl. 343—105)

Figure 1:
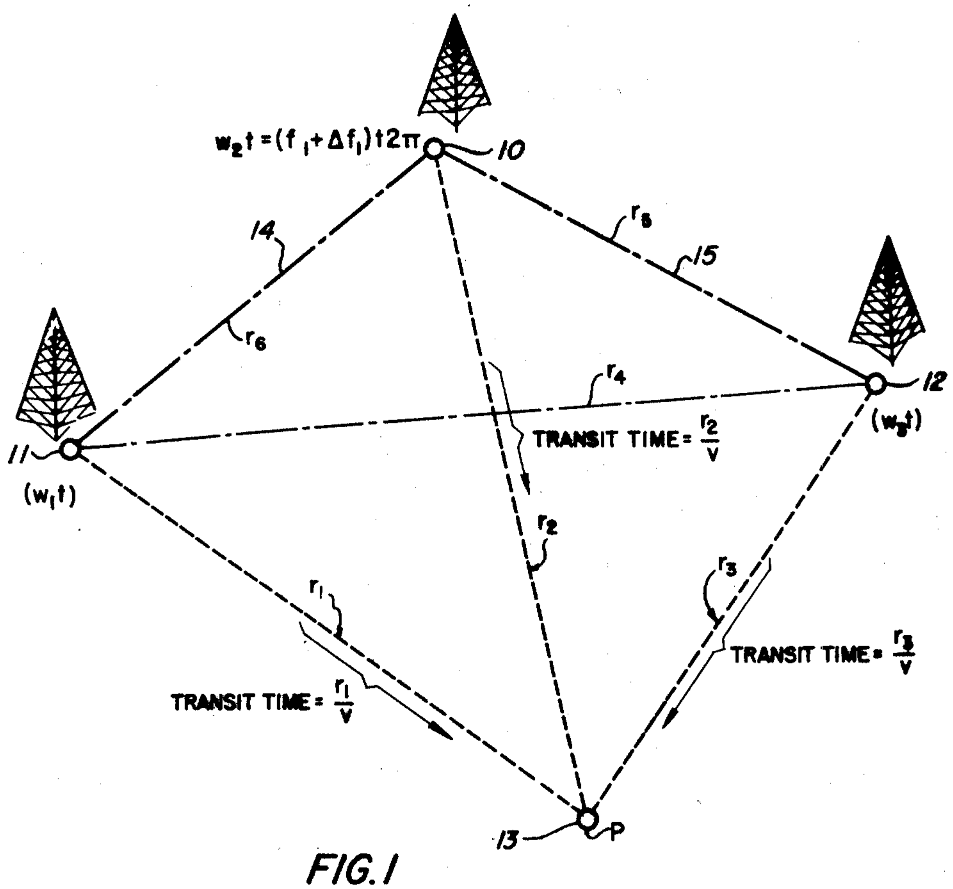

The present invention relates to radio position finding systems and more particularly to improvements in radio position finding systems of the type employing phase comparison in pairs of position indication signals radiated from a plurality of spaced transmitting points to provide indications from which the position of a mobile receiving point relative to the known positions of the transmitting points may be determined.

In systems of the particular type referred to, the continuous waves radiated from each pair of transmitters have a phase relationship which changes as a function of changing position of the receiving point relative to the two transmitting stations. More specifically, the waves radiated by each pair of transmitting units of the system are characterized by spaced isophase lines which are hyperbolic in contour about the transmitting points as foci. Along a base line connecting the pair of transmitters, these isophase lines are spaced apart a distance equal to one-half wave length of the waves radiated from one of the transmitting stations and have diverging spacings at points on either side of this line. With this system arrangement, the position of a receiving point relative to one pair of these hyperbolic isophase lines may be determined by measuring the phase relationship between continuous waves radiated from the pair of transmitters.

Since the point of location of the receiving point along the zone or lane bounded by the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or, alternatively, so to arrange the system that phase shifts between the radiated waves are compensated during the phase comparing operation.

Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining systems. To obviate this problem, systems of the continuous wave hyperbolic type have been proposed (see Honore Patent No. 2,148,267) in which the phase synchronization problem is obviated by heterodyning the carrier waves of each pair of transmitters by a reference receiver located at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of equiphase lines.

While the described arrangement for obviating the phase synchronization problem is entirely satisfactory, it entails the use of two carrier channels in addition to the three or four channels taken up by the three or four continuously operating survey transmitters, in order to make up a complete system.

An improved arrangement for eliminating the link transmitters without eliminating the functions thereof is disclosed and broadly claimed in Hawkins and Finn Patent No. 2,513,317 wherein a pair of transmitters are alternately operated as link transmitters and as position signal transmitters. In the practice of the system described in the above-identified Hawkins and Finn patent, it is desirable that the channel frequencies be located adjacent the broadcast band or at least below the ultra-high frequency band in order to obviate the problem of line-of-sight transmission, which, of course, necessitates the location of a number of channel frequencies in the most crowded portion of the frequency spectrum, at least insofar as operations in the United States are concerned. It is apparent that frequency allocations in this band must be maintained at a minimum and, therefore, a practicable system for providing radio position determinations must be concerned with the problem of economizing in the number of frequency channels employed.

Another system for reducing both the amount of equipment employed and the number of frequency channels used is described and claimed in U. S. Patent No. 2,513,316 to James E. Hawkins, assigned to the same assignee as the present invention, wherein at least two reference signals are modulated upon a single carrier wave radiated by a separate link transmitting unit. In all of the above-described systems, the position indications must be correlated with a map of the area under survey showing the position of the intersecting hyperbolic lines relative to the known locations of the transmitting stations, thereby to obtain an absolute geographical location of the receiving position on the earth.

All of the systems referred to above are characterized by the fact that the link transmitting station or stations are preferably located some distance from the position signal transmitters in order to obviate problems incident to blocking of the reference receiver and the like. The described spacing of the link transmitting station from the position signal transmitters gives rise to errors in the phase meter indications resulting from the transit times of the various signal paths involved as described more fully hereinafter. These errors, which may be termed "third frequency errors," cause inaccuracies in the position indications and prevent an accurate determination of the geographical position of the receiving point on the map. While these errors are generally small, in certain operations, as, for example, in a geophysical survey to locate the optimum site for drilling an oil well or the like where rigid standards of accuracy must be maintained, they may create considerable difficulty. Moreover, in those areas of operation characterized by high lane expansions and low angles of intersection of the hyperbolic isophase lines, the third frequency errors may become significant.

The accuracy of the position indications in the systems just described is also affected by frequency shifts between the position indicating signals and by phase shifts occurring at the reference receiver at the link transmitting station.

It is a principal object of the present invention, therefore, to provide a radio location system of the character described above wherein the aforementioned inaccuracies in the position indications are eliminated or minimized.

Another object of the present invention is to provide improved receiving apparatus for use in radio location systems of the type described above.

A further object of the invention is to provide receiving apparatus for use in radio location systems of the type described above to produce position indications which are free from third frequency errors.

It is also an object of the present invention to provide a radio location system of the character described above in which the position indications produced are free from errors resulting from frequency shifts between the radiated signals.

A still further object of the invention is to provide a radio location system of the type described above in which the position indications produced are free from errors resulting from phase shifts occurring at the link transmitting stations.

It is likewise an object of the present invention to provide improved transmitting equipment for use in radio location systems of the above-indicated character.

Figure 2:
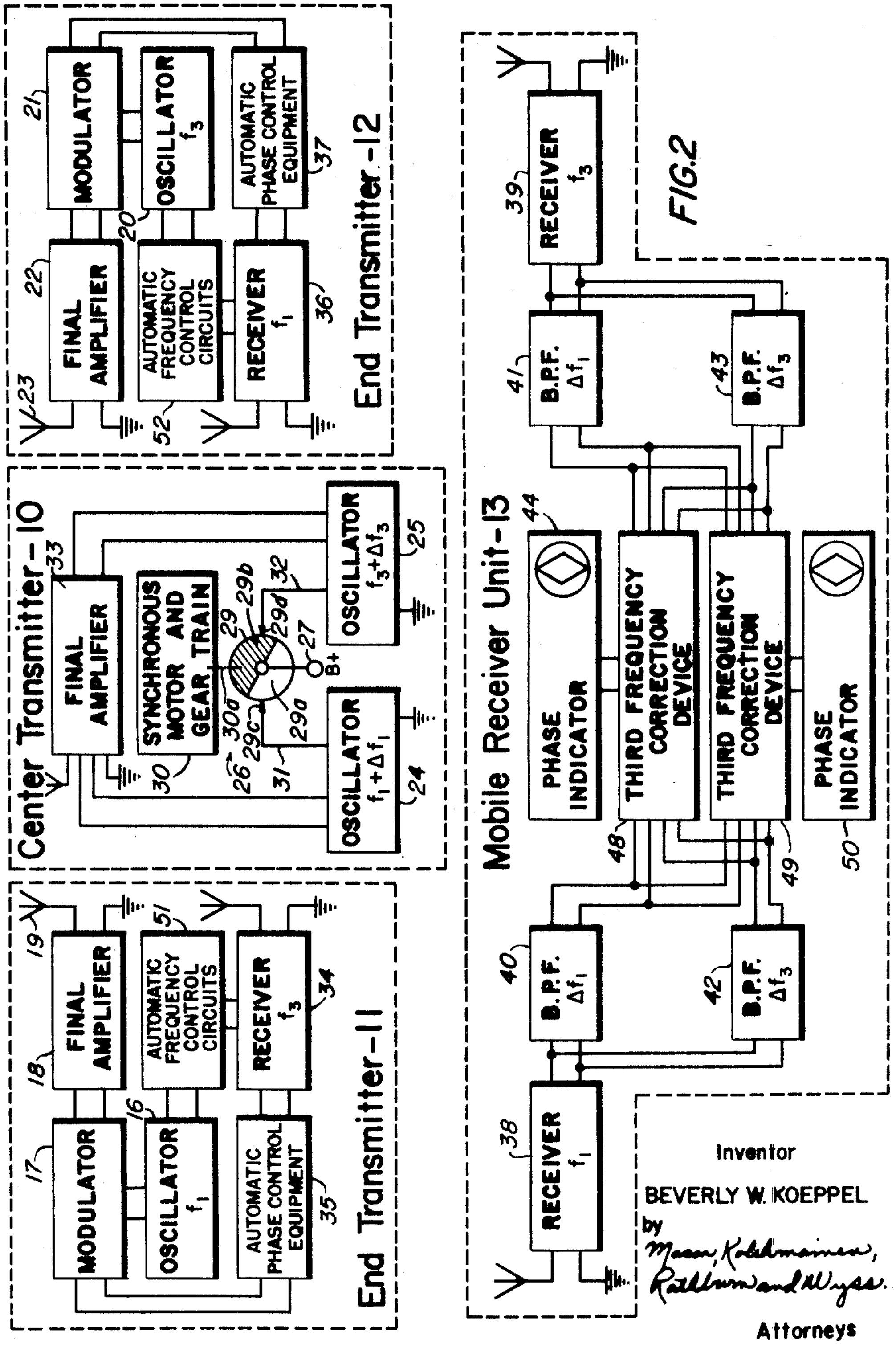
Figure 2A:
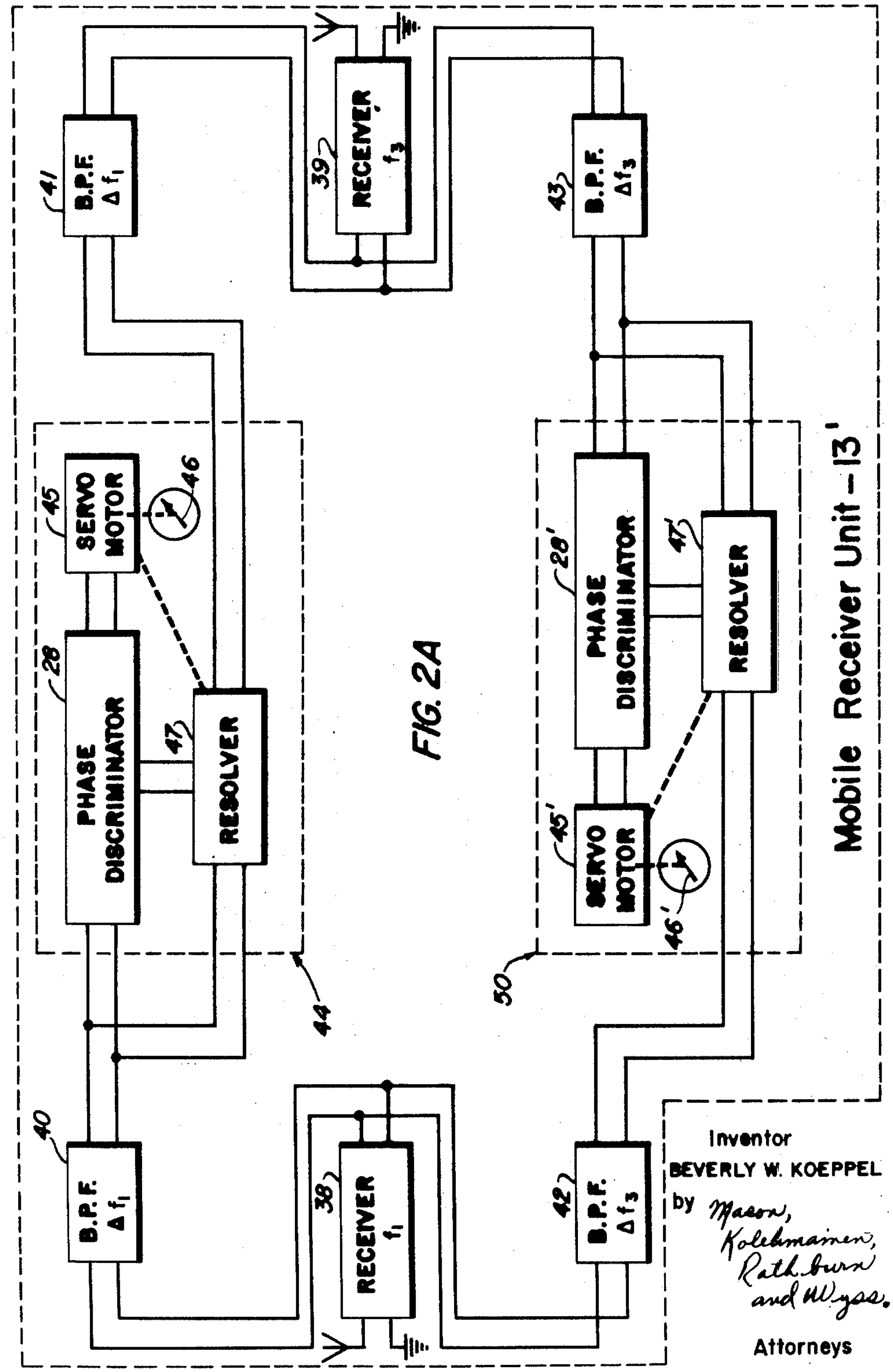
Figure 3:
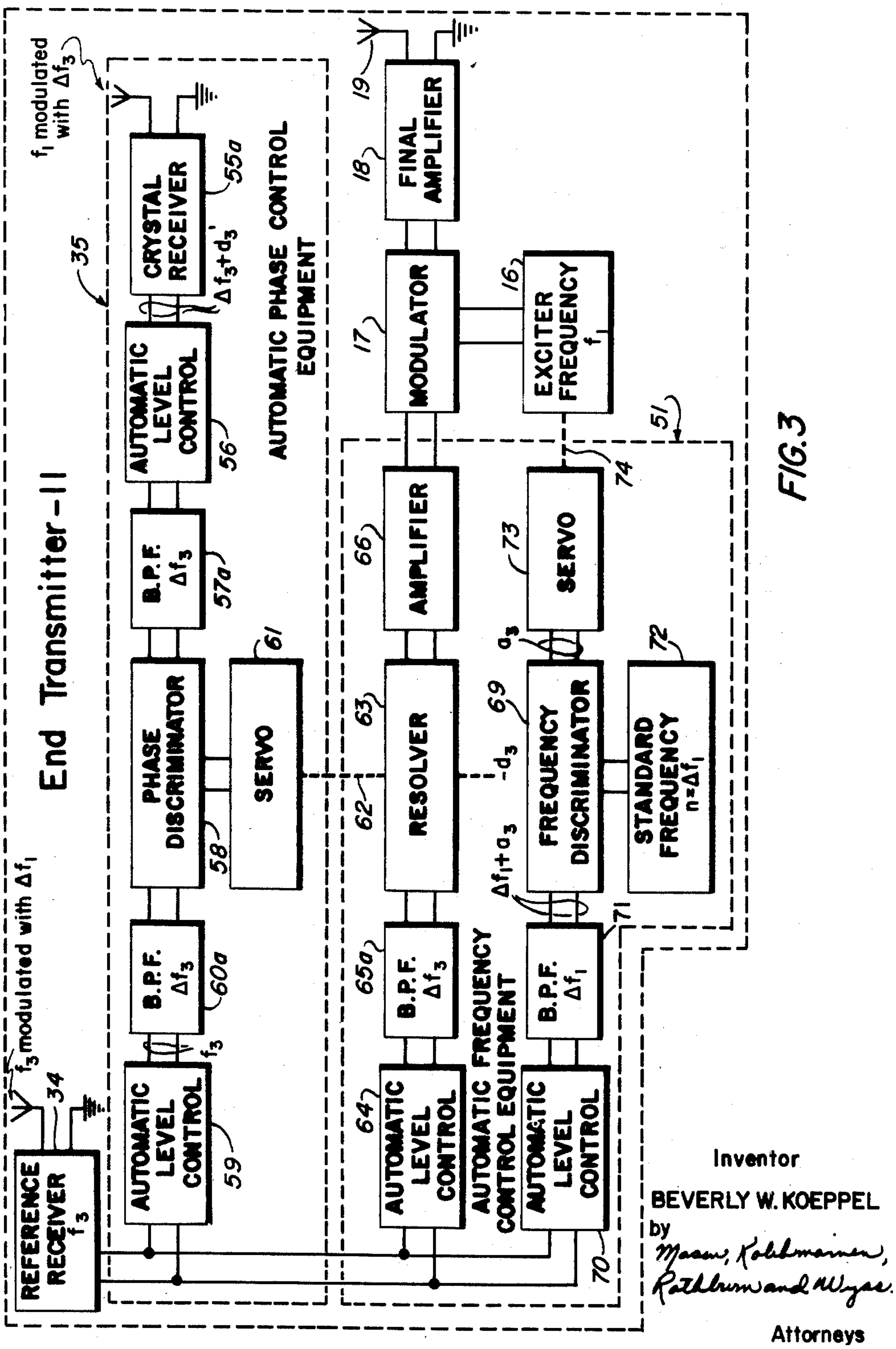
Figure 4:
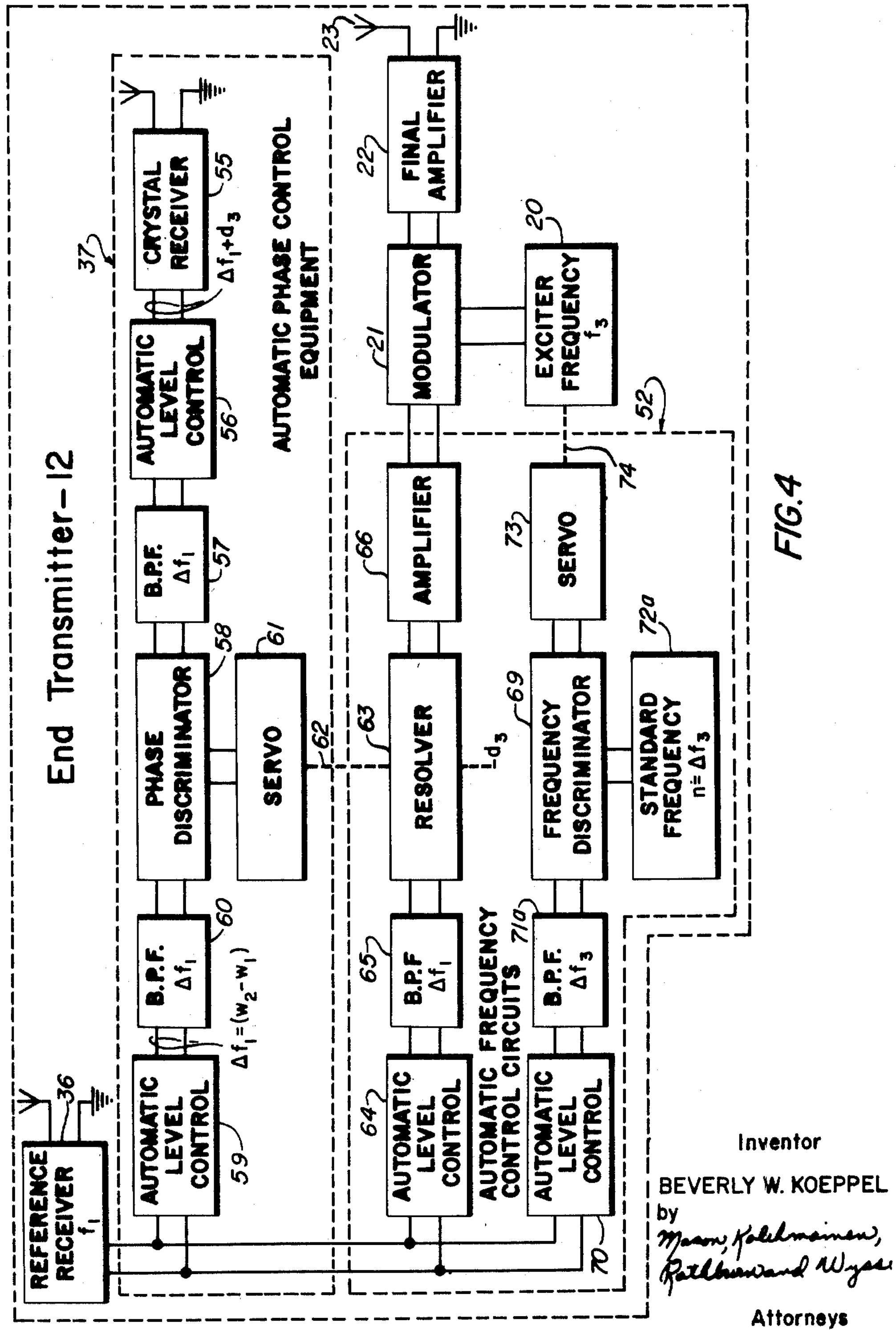
Figure 5:
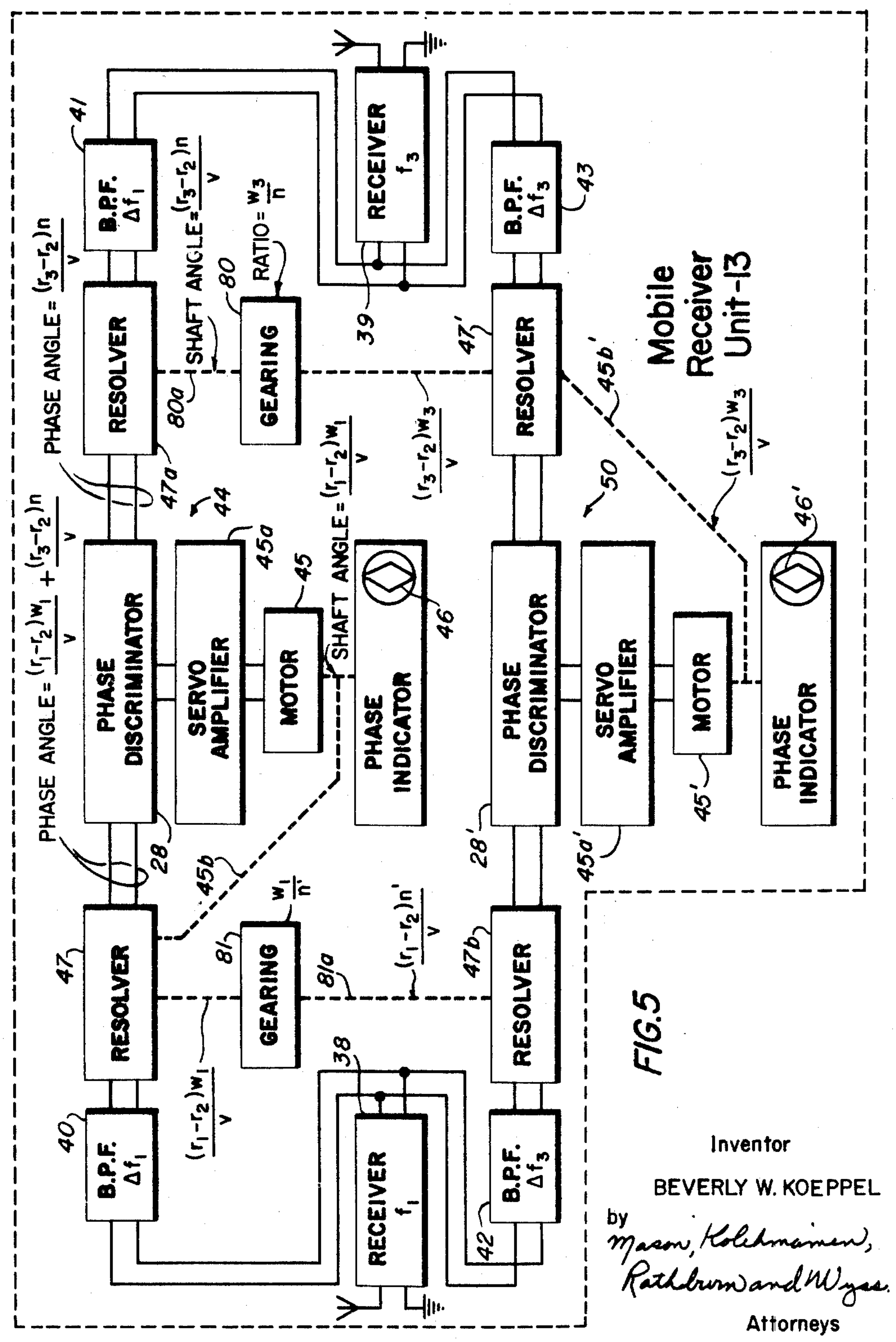
Figure 6:
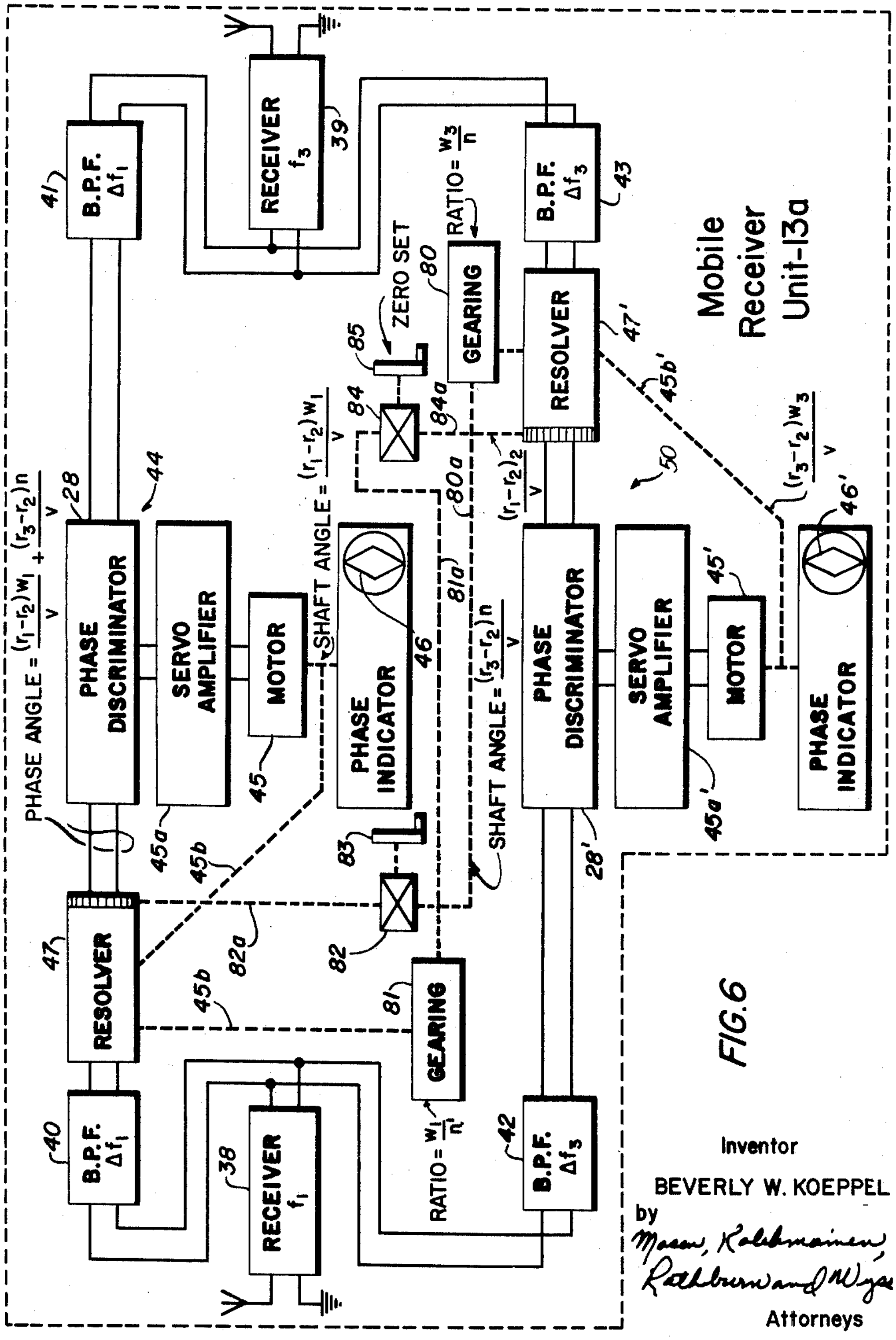
Figure 7:
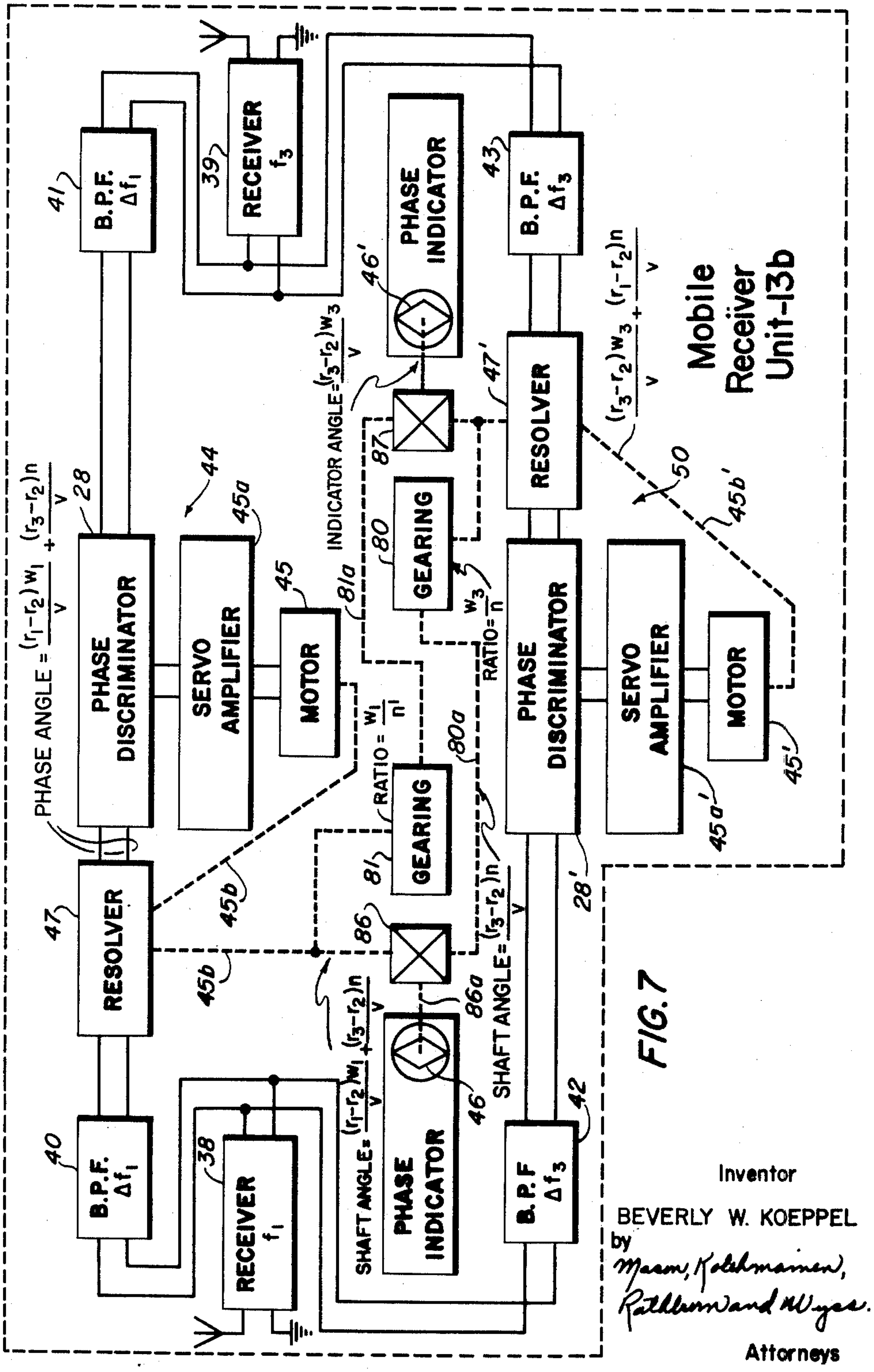
Figure 8:
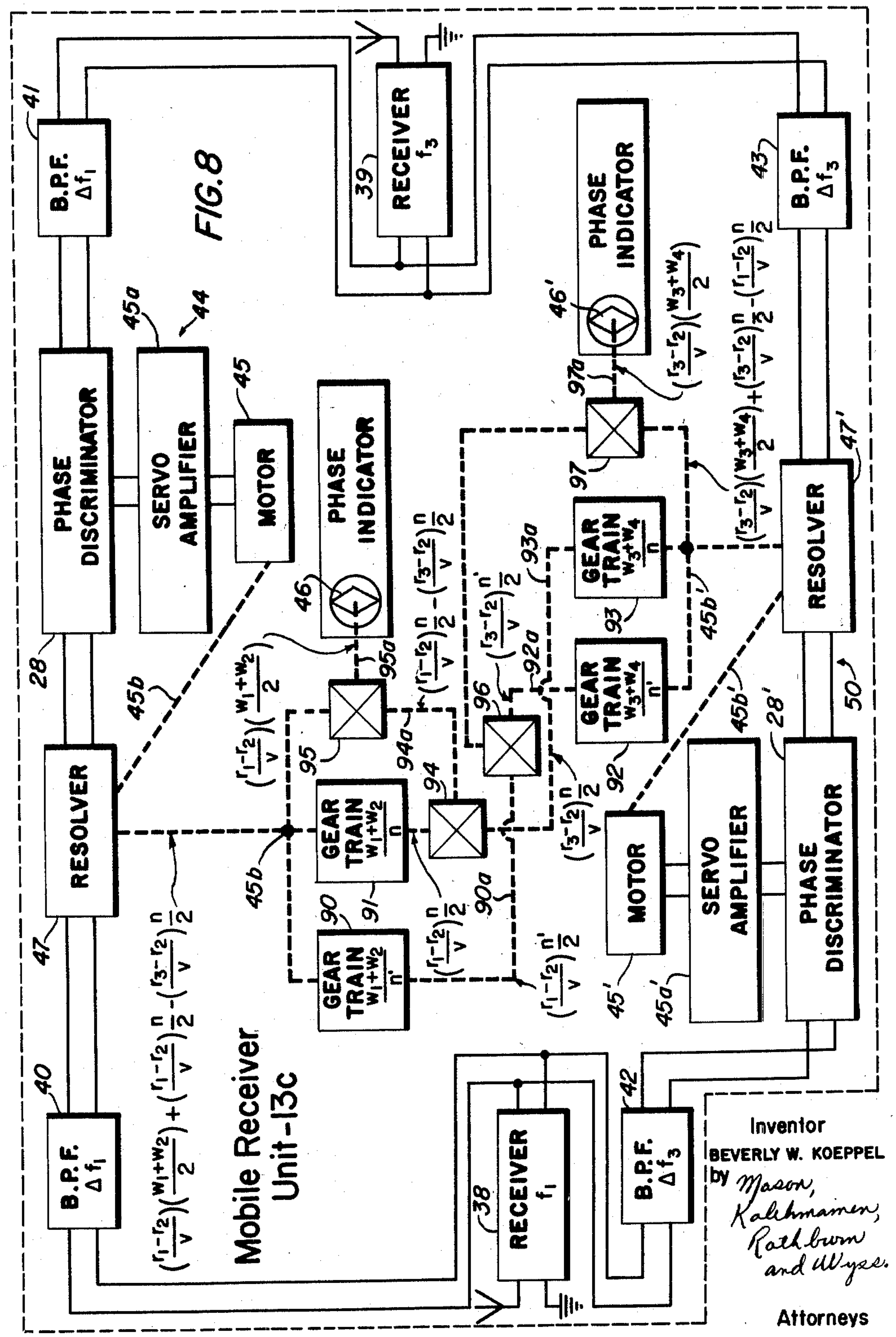

The invention, both as to its organization and method of operation, together with further objects and advantages thereof, will best be understood by reference to the specification taken in conjunction with the accompanying drawings in which:

Fig. 1 diagrammatically illustrates a three-foci radio location system;

Fig. 2 diagrammatically illustrates the component elements comprising the transmitting and receiving units employed in the system shown in Fig. 1;

Fig. 2A diagrammatically illustrates the mobile receiving equipment employed in prior art arrangements;

Figs. 3 and 4 diagrammatically illustrate the equipment comprising the end transmitting units of the system shown in Figs. 1 and 2;

Fig. 5 diagrammatically illustrates the equipment comprising a mobile receiving unit characterized by the features of the present invention, which receiver unit may be employed in the system shown in Figs. 1 and 2;

Fig. 6 diagrammatically illustrates an alternative arrangement of the mobile receiver unit which may be used in the system shown in Figs. 1 and 2;

Fig. 7 diagrammatically illustrates still another construction of the mobile receiver unit for use in the system shown in Figs. 1 and 2; and Fig. 8 diagrammatically illustrates another construction of the mobile receiver unit for use in the system shown in Figs. 1 and 2.

Referring now to the drawings, and, more particularly, to Fig. 1 thereof, there is illustrated a three-foci system for providing position information at any number of mobile receiver units 13 which may be carried by vessels or vehicles operating within the radius of transmission of three spaced transmitting units or stations 10, 11 and 12. The transmitting unit 10 is preferably spaced at approximately equal and relatively large distances from the transmitting units 11 and 12 and these three units are so positioned that the base line 14 interconnecting the points of location of the units 10 and 11 is angularly related to the base line 15 interconnecting the points of location of the units 10 and 12. The system shown in Fig. 1, except for the error correction or eliminating devices to be described more fully hereinafter, is identical to the transmitting and receiving system described and claimed in U. S. Patent No. 2,513,317 referred to above.

Thus, as described in the latter patent, the end transmitting units 11 and 12 are equipped continuously to radiate position indicating signals in the form of carrier waves of different frequencies, whereas the center transmitting unit 10 is equipped alternately to radiate two additional position indicating signals in the form of carrier waves of still different frequencies. Specifically, as is illustrated in Fig. 2, the transmitter employed at the end station 11 comprises a carrier wave generator or oscillator 16, a modulator unit 17 and a final amplifier 18, through which signals are passed to an emitting antenna 19. Similarly, the transmitting equipment employed at the end transmitting station 12 comprises a carrier wave generator or oscillator 20, a modulator unit 21 and a final, or power, amplifier 22 through which signals are passed to an emitting antenna 23. In accordance with a feature of the present invention, the end transmitters 11 and 12 are also provided with automatic frequency control circuits 51 and 52, respectively, which will be described more fully hereinafter and which function to control the frequencies of the waves radiated from the end stations to maintain constant differences between these waves and those radiated from the center transmitter 10.

The center transmitting unit 10 comprises two carrier wave generators or oscillators 24 and 25 for respectively creating position indicating signals at two different carrier frequencies, together with switching means indicated generally at 26 for alternately rendering these two oscillators operative. The signals alternately developed by the oscillators 24 and 25 are supplied to a final amplifier 33 for space radiation. In the arrangement illustrated, keying of the oscillators 24 and 25 for alternate operation is accomplished by alternately feeding anode current to the electron discharge tubes employed in these oscillator circuits from the positive terminal 27 of an anode current source, not shown, through a commutating ring 29 which is connected by means of a shaft 30*a* to be driven at a constant speed by a synchronous motor and gear train unit 30. More specifically, the positive terminal 27 of the anode current source is connected to the conductive segment 29*a* of the commutating ring 29, which segment spans slightly less than one-half of the circumference of the ring. The remainder of the commutating ring is comprised of an insulating segment 29*b*. At diametrically opposed points around the circumference of the ring brushes 29*c* and 29*d* are provided in engagement with the ring periphery. These brushes are respectively connected to positive bus conductors 31 and 32 leading to the oscillators 24 and 25, so that anode current is alternately delivered to the electron discharge tubes of these two oscillators. Since the conductive segment 29*a* of the ring 29 represents slightly less than half the periphery surface of the ring, it will be understood that a short off period is provided between successive periods during which the oscillators 24 and 25 are alternately operated, thus preventing simultaneous generation of signals by both of these oscillators. The periodicity with which the two oscillators 24 and 25 are alternately operated is, of course, dependent upon the speed of rotation of the commutating ring 29. Preferably, this ring is driven at a speed of one revolution per second, such that the oscillators 24 and 25 are each rendered operative at one-half second intervals.

As indicated above, the carrier frequencies at which the four oscillators at the three transmitting units 10, 11 and 12 operate are all different. Thus, the oscillator 16 at the end transmitter 11 is adapted to generate signals having a frequency of $f_1$, while the oscillator 20 at the end transmitter 12 is adapted to generate signals having a frequency of $f_3$. The oscillator 24 at the center transmitter 10 develops signals having a frequency of $$(f_1+\Delta f_1)$$

in which $\Delta f_1$ is a small audio frequency difference, while the oscillator 25 develops signals having a frequency $(f_3+\Delta f_3)$, in which $\Delta f_3$ is a small audio frequency different from $\Delta f_1$. Thus, the four waves created by the various oscillators at the three transmitting units are so paired that the frequencies of each pair are all within a single channel allocation of 10 kilocycles as specified by the Federal Communications Commission of the United States Government. Specifically, the signal developed by the oscillator 16 and that developed by the oscillator 24 fall within a first frequency channel, while the signal developed by the oscillator 20 and that developed by the oscillator 25 fall within a second frequency channel, these two frequency channels being separated by several kilocycles in frequency in order to permit separation and selective reception of the signals in the manner described below. The power output of the signals radiated from the transmitting units 10, 11 and 12 is such that the entire area in which position information may be desired aboard the vehicles or vessels carrying the receiving units 13 is blanketed with waves radiated from each of these transmitting stations and the these waves have a field strength at all points within this area sufficient to permit reliable reception without requiring undue sensitivity of the receiving equipment.

To avoid the aforementioned difficulties attendant upon phase synchronization of the position indicating waves radiated by the three transmitting units, while at the same time eliminating the necessity for utilizing additional frequency channels, means are provided at the end transmitting stations 11 and 12 for alternately modulating the waves radiated from these end stations with reference signals representative of the difference frequencies between the carrier wave pairs. These reference signals may be received at any receiving point, such, for example, as the mobile receiving unit 13, located within the radius of transmission of the three transmitting stations. The equipment provided for this purpose at the end transmitter 11 comprises an amplitude modulation receiver 34 tuned to receive the signal generated by the oscillator 20 at the end transmitter 12 and the signal generated by the oscillator 25 at the center transmitter 10. The selectivity of this receiver is obviously such that the signal generated by the oscillator 24 at the center transmitter 10 and by the oscillator 16 at the end transmitter 11 are rejected. The beat frequency of $\Delta f_3$ between the two carriers acepted by the radio frequency section of the receiver 34 is developed in the audio frequency section of the latter receiver and is delivered through automatic phase control equipment 35 to be described hereinafter to the modulator 17, where it is amplitude modulated upon the carrier output signal radiated from the end transmitter 11. The output of the receiver 34 also includes a band pass filter 65*a* tuned to pass signals having a frequency of $\Delta f_3$ (see Fig. 3), although this band pass filter is not shown in Fig. 2.

In similar manner, the end transmitting unit 12 is equipped with an amplitude modulation receiver 36 tuned to receive the signals developed by the oscillator 16 at the end transmitter 11 and those developed by the oscillator 24 at the center transmitter 10. Here, again, the selectivity of the receiver 36 is obviously such that the signals developed by the oscillator 25 at the center transmitter 10 and by the oscillator 20 at the end transmitter 12 are rejected. The beat frequency of $\Delta f_1$ between the two carrier waves accepted by the receiver 36 is reproduced in the audio frequency section of this receiver and is passed through a suitable band pass filter 65 (shown in Fig. 4) tuned to a frequency of $\Delta f_1$ and through automatic phase control equipment 37 to be described more fully hereinafter to the modulator 21, where this beat frequency is modulated upon the carrier wave radiated from the end transmitter 12.

Referring now to the equipment provided at the mobile receiver unit 13, it will be observed that this equipment includes an amplitude modulation receiver 38 tuned to accept the waves falling within the $f_1$ frequency channel, a second amplitude modulation receiver 39 tuned to receive the waves falling within the $f_3$ frequency channel, a pair of narrow band pass filters 40 and 41 tuned to pass frequencies of $\Delta f_1$, a second pair of narrow band pass filters 42 and 43 tuned to pass signals having a frequency of $\Delta f_3$, a pair of phase indicators 44 and 50 of conventional construction and a pair of third frequency error correction devices 48 and 49 to be described more fully hereinafter. The receiver 38 is fixed tuned to accept the signals generated by the oscillator 16 at the end transmitter 11 and by the oscillator 24 at the center transmitter 10. The receiver 38 is, of course, sufficiently selective to reject the signals developed by the oscillator 20 at the end transmitter 12 and by the oscillator 25 at the center transmitter 10. The receiver 39 is tuned to accept the signals generated by the oscillator 20 at the end transmitter 12 and by the oscillator 25 at the center transmitter 10. Here, again, the selectivity of the receiver 39 is such that the signals developed by the oscillators 16 and 24 are rejected. The phase indicators 44 and 50, which will be discussed in more detail as the description proceeds, are preferably of the type shown in Hawkins and Koeppel Patent No. 2,551,211, assigned to the same assignee as the present invention. The filters 40, 41, 42 and 43, which may be of any standard commercial construction, perform the function of selecting the heterodyne or difference frequency signals alternately developed at the output terminals of the receivers 38 and 39 and the reference signals alternately developed at these output terminals and delivering the same through the third frequency correction devices to the phase indicators 44 and 50. Each of these phase indicators is capable of measuring the phase relationship between the signals applied to its input terminals by indicating phase angles of less than 360 electrical degrees between the two impressed input signals. Each phase meter is equipped with a rotatable rotor carrying a pointer 46 (Fig. 2A) which indexes with a circular scale to indicate the phase relationship between the two impressed input signals. If desired, each meter may also be equipped with a revolution counter gear driven from the rotor element of the meter to count the isophase lines traversed by the mobile receiving unit 13 as it moves through the area.

Turning now to the operation of the above-described position-determining system, it will be understood that when the motor and gear train 30 is operating to drive the commutating ring 29 anode current is alternately delivered to the electron discharge tubes of the oscillators 24 and 25, such that these oscillators are alternately rendered operative to generate position indicating signals of the indicated frequencies. The transmitters at the units 11 and 12, on the other hand, operate continuously. Accordingly, during each interval when the center transmitter 10 is effective to radiate the signals developed by the oscillator 24, the carrier waves respectively radiated by the transmitters 10 and 11 are accepted and heterodyned by the receivers 36 and 38. In the receiver 36 the difference frequency of $\Delta f_1$ is reproduced and passed to the modulator 21 for radiation as a reference signal, so that the end transmitter 12 functions as a link transmitting unit during the interval of operation now being described. The modulated carrier wave radiated by the end transmitter 12 is received by the receivers 34 and 39. At the receiver 34 the modulation component is detected but it is rejected by the band pass filter 65*a* at the output of this receiver. The detected modulation component is, however, passed by the filter 71 (Fig. 3) at the end transmitter 11 and is employed to excite the automatic frequency control equipment 51 in a manner described more fully below. At the receiver 39 the modulation component $\Delta f_1$ is reproduced and passed through the band pass filter 41 to the third frequency correction devices 48 and 49. During the interval of operation being described, the oscillator 25 is inoperative and, accordingly, no heterodyne or beat frequency signals are developed by the receiver 34 or by the receiver 39.

The beat frequency of $\Delta f_1$ resulting from heterodyning of the carrier waves radiated from the center transmitter 10 and the end transmitter 11 in the receiver 38 during the described interval is reproduced across the output terminals of this receiver and applied through the band pass filter 40 to the third frequency correction devices 48 and 49. Thus, two signal voltages of identical frequency are supplied through the band pass filters 40 and 41 with the result that the phase indicator 44 functions in a manner described below to measure the phase relationship between these two signals. As will be recognized by those skilled in this art, and particularly from an understanding of the above-identified patent, this phase measurement is accurately representative of the position of the mobile receiving unit 13 between isophase lines having foci at the center transmitter 10 and at the end transmitter 11.

At the end of the described transmitting interval the commutating ring 29 functions to interrupt the circuit for delivering anode current to the oscillator 24, with the result that carrier wave radiation from the center transmitter 10 is terminated. As a result, the heterodyning action taking place at the receivers 36 and 38 ceases, thereby interrupting the reference signal radiation by the end transmitter 12 and halting the development of heterodyne or difference frequency signals at the output terminals of the receiver 38. Thus, the phase meter 44 is rendered ineffective further to change the setting of its indicating element 46.

A short time interval after operation of the oscillator 24 is interrupted, the commutating ring 29 functions to deliver anode current to the electron discharge tube or tubes of the oscillator 25, with the result that the center transmitter 10 is rendered effective to radiate signals having a frequency of $(f_3+\Delta f_3)$. The latter signal is accepted by the receivers 34 and 39 but is rejected by the receivers 36 and 38. The receiver 34 functions to heterodyne the signal received from the center transmitter 10 with that received from the end transmitter 12 to develop a beat frequency of $\Delta f_3$ for application through the band pass filter and through the automatic phase control equipment to the modulator 17, with the result that the carrier wave radiated from the end transmitter 11 is modulated with a reference signal. This modulated signal is accepted by the receiver 38 at the mobile receiver unit and the modulation component is reproduced in the usual manner. The reference signal thus developed across the output terminals of the receiver 38 is applied through the band pass filter 42 to the third frequency correction devices 48 and 49. The modulated signal emanating from the end transmitter 11 is also accepted by the receiver 36 at the end transmitter 12 where the modulation component is detected and passed through filter 71*a* (Fig. 4) to energize the automatic frequency control circuits in a manner described more fully below. The detected modulation component is, of course, rejected by the filter 60 (Fig. 4) and, hence, does not pass to the modulator 21.

The two carrier waves accepted by the receiver 39 from the center transmitter 10 and from the end transmitter 12 are heterodyned to produce a beat frequency of $\Delta f_3$ for application through the band pass filter 43 to the third frequency correction devices 48 and 49. Thus, reference and heterodyne or difference frequency signals of identical frequencies are respectively passed through the band pass filters 42 and 43, with the result that the phase indicator 50 provides a measurement of the phase relationship between these two signals to indicate the position of the mobile receiving unit 13 relative to isophase lines having foci at the center transmitter 10 and the end transmitter 12.

At the end of the described transmitting interval, the commutating ring 29 functions to interrupt anode current flow to the oscillator 25 in order to prevent radiation of the signal developed by this oscillator from the center transmitter 10. When carrier wave radiation from the center transmitter is thus terminated, the wave heterodyning action occurring at the receivers 34 and 39 is instantly stopped to terminate the radiation of the reference signal by the end transmitter 11 and also to terminate reproduction of the difference or heterodyne signal at the output terminals of the receiver 39. Thus, the application of signal voltages to energize the phase indicator 50 is interrupted, with the result that no further change in the setting of the indicating elements of this meter occurs. A short time interval after operation of the oscillator 25 is arrested, the commutating ring 29 functions to recomplete the circuit for delivering anode current to the oscillator 24 and thus reinitiate operation in the manner previously described.

From the foregoing explanation it will be understood that the indications provided by the phase indicators 44 and 50 identify a pair of intersecting hyperbolic isophase lines passing through the point of location P (Fig. 1) of the craft or vehicle carrying the mobile receiver unit 13. The ambiguity present in the indications provided by the indicators 44 and 50 may be resolved by resort to any of the systems known in this art. Moreover, if the indicators 44 and 50 are provided with revolution counters in the manner described above, the lanes traversed by the mobile receiver unit 13 from a known starting point may be counted to effect ambiguity resolution.

To translate the phase indicator readings into a position identification, these readings are referred to a chart of the area in which the transmitting stations 10, 11 and 12 are located. This chart contains, in addition to the geographic positions of the transmitting stations, intersecting sets of hyperbolic lines forming a grid-like pattern blanketing the area, these hyperbolic lines having foci at the transmitting stations and being representative of isophase lines corresponding to the phase indicator readings. To use such a chart, the mobile receiver is initially "zeroed" when stationed at a known geographic location where its phase indicators (both the indicating pointer 46 and the revolution counter) are adjusted until the phase indicator readings correspond to the hyperbolic lines on the chart intersecting at the known location. Thereafter, movement of the mobile receiver unit is accompanied by a corresponding change in phase indicator readings so that the latter may be referred to the chart to provide continuous position identification. The lines on the chart are true hyperbolas and, accordingly, if the phase indicator variations are not truly hyperbolic, the position information derived will be inaccurate. In the ensuing description it will be shown that the indications provided by the phase meters 44 and 50 in the absence of the error correction devices of the present invention, i. e., the automatic frequency control circuits 51 and 52, the automatic phase control equipments 35 and 37 and the third frequency correction devices 48 and 49, would contain certain errors and inaccuracies causing the phase indicator readings to deviate from truly hyperbolic variations and, hence, preventing an accurate determination of the position of the mobile receiver unit 13. To illustrate the functions accomplished by these error correction devices, it is desirable to consider what would occur if they were eliminated. Thus, during the interval of operation when the baseline stations 10 and 11 are radiating continuous unmodulated waves having frequencies of $(f_1+\Delta f_1)$ and $f_1$, respectively, the radiated signals may be expressed as follows:

$$S_{11}=E_1 \sin (w_1t+a_1) \quad (1)$$

$$S_{10}=E_2 \sin (w_2t+a_2) \quad (2)$$

where $E_1$ and $E_2$ are the peak amplitudes of the radiated signals, $w_1$ and $w_2$ are the radian frequencies, $t$ is time and $a_1$ and $a_2$ are static angular displacements at $t=0$, and $S_{10}$ and $S_{11}$ are the signals respectively radiated from stations 10 and 11.

Equations 1 and 2 represent the signals as they leave the stations 11 and 10, respectively. If a velocity of propagation $v$ which is correct in value and constant over the entire area of operation of the system is assumed, the transit times required for the signals to reach the receiving point P from stations 10 and 11 may be expressed as:

$$t_{10-P}=\frac{r_2}{v} \quad (3)$$

$$t_{11-P}=\frac{r_1}{v} \quad (4)$$

where $r_1$ and $r_2$ represent the distances between receiving point P and station 11 and between point P and station 10, respectively, as illustrated in Fig. 1.

From Equations 3 and 4 it can be seen that the signals received at point P lag in time the signals radiated from the baseline stations. This delay may be included in Equations 1 and 2 to obtain an expression for the signals received at point P relative to the time of their radiation from the baseline stations:

$$S_{11(P)}=E_1 \sin\left[w_1t+\left(a_1-\frac{w_1r_1}{v}\right)\right] \quad (5)$$

$$S_{10(P)}=E_2 \sin\left[w_2t+\left(a_2-\frac{w_2r_2}{v}\right)\right] \quad (6)$$

The two signals expressed by Equations 5 and 6 appear on the receiving antennas of the mobile receiving unit 13 and, after amplification, are combined in a detector and passed through filter 40, whose output is as follows:

$$e_P=E_P \cos\left[(w_2-w_1)t+\frac{(r_1-r_2)w_1}{v}-\frac{(w_2-w_1)r_2}{v}+(a_2-a_1)\right] \quad (7)$$

Equation 7 is derived in the following manner: First, Equations 5 and 6 may be rearranged as follows:

$$S_{11(P)}=E_1 \sin\left[w_1t+\left(a_1-\frac{w_1r_1}{v}\right)\right] \quad (5a)$$

$$S_{10(P)}=E_2 \sin\left\{[w_1+(w_2-w_1)]t+a_2-\frac{[w_1+(w_2-w_1)]r_2}{v}\right\}$$

or $$S_{10(P)}=E_2\left[\sin w_1t+(w_2-w_1)t+\left(a_2-\frac{(w_2-w_1)r_2}{v}-\frac{w_1r_2}{v}\right)\right] \quad (6a)$$

Expanding Equations 5*a* and 6*a* yields:

$$S_{11(P)}=E_1 \sin(w_1t) \cos\left(a_1-\frac{w_1r_1}{v}\right)+E_1 \cos(w_1t) \sin\left(a_1-\frac{w_1r_1}{v}\right) \quad (5b)$$

$$S_{10(P)}=E_2 \sin(w_1t)\left[\cos(w_2-w_1)t+\left(a_2-\frac{(w_2-w_1)r_2}{v}-\frac{w_1r_2}{v}\right)\right]+E_2 \cos\left[(w_1t) \sin(w_2-w_1)t+\left(a_2-\frac{(w_2-w_1)r_2}{v}-\frac{w_1r_2}{v}\right)\right] \quad (6b)$$

Combining in the detector of the receiver 38 at the mobile receiving unit produces the following sum:

$$S_{11(P)}+S_{10(P)}=\sin(w_1t)\left\{E_1 \cos\left(a_1-\frac{w_1r_1}{v}\right)+E_2 \cos\left[(w_2-w_1)t+a_2-\frac{(w_2-w_1)r_2}{v}-\frac{w_1r_2}{v}\right]\right\}+\cos w_1t\left\{E_1 \sin\left(a_1-\frac{w_1r_1}{v}\right)+E_2 \sin\left[(w_2-w_1)t+a_2-\frac{(w_2-w_1)r_2}{v}-\frac{w_1r_2}{v}\right]\right\} \quad (8)$$

Equation 8 takes the form of:

$$S_{11(P)}+S_{10(P)}=A \cos w_1t+B \sin w_1t \quad (9)$$

where A and B are the coefficients of the sin and cos terms in Equation 8.

Dividing and multiplying the right-hand side of the above equation by the square root of the sum of the squares of A and B yields:

$$S_{11(P)}+S_{10(P)}=\sqrt{A^2+B^2}\left[\frac{A}{\sqrt{A^2+B^2}} \cos w_1t+\frac{B}{\sqrt{A^2+B^2}} \sin w_1t\right]$$

Now $$\frac{A}{\sqrt{A^2+B^2}}$$

may be taken as the sine of a new angle C and $$\frac{B}{\sqrt{A^2+B^2}}$$

as the cosine of the same angle or:

$$S_{11(P)}+S_{10(P)}=\sqrt{A^2+B^2}\,[\sin C \cos w_1t+\cos C \sin w_1t]$$

or $$S_{11(P)}+S_{10(P)}=\sqrt{A^2+B^2} \sin(w_1t+C) \quad (10)$$

in which:

$$C=\tan^{-1}\frac{A}{B}$$

Thus, Equation 8 should be capable of reduction to the amplitude and sine function of a single carrier frequency. The amplitude $\sqrt{A^2+B^2}$ may be solved by substituting the expressions for A and B from Equation 8 and expanding the amplitude expression by the Binomial Theorem. The resulting expression after several simplification steps will be as follows:

$$\sqrt{A^2+B^2}=\left[(E_1^2+E_2^2)^2-\tfrac{1}{4}\frac{(E_1E_2)^2}{(E_1^2+E_2^2)^{3/2}}\right]+\left[\frac{E_1E_2}{(E_1^2+E_2^2)^2}+\tfrac{3}{8}\frac{(E_1E_2)^3}{(E_1^2+E_2^2)^{5/2}}\right]\cos\left[(w_2-w_1)t+\frac{(r_1-r_2)w_1}{v}-\frac{(w_2-w_1)r_2}{v}\right]+(a_2-a_1)-\left[\tfrac{1}{4}\frac{(E_1E_2)^2}{(E_1^2+E_2^2)^{3/2}}\right]\cos 2\left[(w_2-w_1)t+\frac{(r_1-r_2)w_1}{v}-\frac{(W_2-w_1)r_2}{v}+(a_2-a_1)\right]+\left[\tfrac{1}{8}\frac{(E_1E_2)^3}{(E_1^2+E_2^2)^{5/2}}\right]\cdot\cos 3\left[(w_2-w_1)t+\frac{(r_1-r_2)w_1}{v}-\frac{(w_2-w_1)r_2}{v}+(a_2-a_1)\right]+\cdots \quad (11)$$

The amplitude modulation detector of the receiver 38 thus reproduces the modulation envelope corresponding to Equation 11 above and eliminates the carrier frequency. This detected signal passes through the band pass filter 40 which eliminates the direct current term and the higher order harmonics so that the only term remaining for phase comparison purposes is:

$$e_P=E_P \cos\left[(w_2-w_1)t+\frac{(r_1-r_2)w_1}{v}-\frac{(w_2-w_1)r_2}{v}+(a_2-a_1)\right] \quad (7)$$

in which $E_P$ is the coefficient of the second term of Equation 11 above. The above expression for $e_P$, of course, corresponds to Equation 7.

By a similar procedure, it can be shown that the signal supplied to the modulator 21 at the end transmitter 12 is:

$$e_R=E_R \cos\left[(w_2-w_1)t+\frac{(r_4+r_5)w_1}{v}-\frac{(w_2-w_1)r_5}{v}+(a_2-a_1)\right] \quad (12)$$

wherein $r_4$ is the distance from station 11 to the end transmitter 12, which during the interval is functioning as a link transmitter, and $r_5$ is the distance from the center transmitter 10 to the end transmitter 12, as illustrated in Fig. 1.

The term $$\left[\frac{(r_4+r_5)w_1}{v}-\frac{(w_2-w_1)r_5}{v}\right]$$

is a phase angle $a_3$ since it consists exclusively of constants and thus:

$$e_R=E_R \cos[(w_2-w_1)t+a_3+(a_2-a_1)] \quad (13)$$

The signal expressed by Equation 13 experiences a time delay of $$\frac{r_3}{v}$$

in traveling to the receiving point P and, in addition, a phase angle change $d_3$ may be incurred as the signal is modulated upon the carrier radiated from the end transmitter 12. Thus, the modulation signal detected by the receiver 39 at the mobile receiver unit may be expressed as:

$$E_R \cos\left[(w_2-w_1)t-\frac{(w_2-w_1)r_3}{v}+d_3+a_3+(a_2-a_1)\right] \quad (14)$$

Equations 7 and 14 express the two signals passed by the filters 40 and 41, respectively, and may be rewritten as:

$$E \cos[(w_2-w_1)t+D] \quad (7a)$$

and $$E \cos[(w_2-w_1)t+F] \quad (14a)$$

wherein $$D=\frac{(r_1-r_2)w_1}{v}-\frac{(w_2-w_1)r_2}{v}+(a_2-a_1) \quad (15)$$

and $$F=-\frac{(w_2-w_1)r_3}{v}+d_3+a_3+(a_2-a_1) \quad (16)$$

in which $E_P$ and $E_R$ are assumed to be equal, an assumption which is valid by virtue of the automatic level control circuits employed in receivers 38 and 39. In addition, it can be shown that $E_P$ and $E_R$ have no effect on the final result even if they are unequal, although, to simplify the present description, no attempt will be made to make such a showing herein.

If the third frequency error correction devices 48 and 49 are eliminated from the mobile receiver unit 13 illustrated in Fig. 2 and if the signals from filters 40 and 41 are passed directly to a phase indicating system and apparatus 44 of the type described and claimed in the above-identified Hawkins and Koeppel Patent No. 2,551,211, the resulting circuit will be as illustrated in Fig. 2A. Thus, the heterodyne signal of frequency $\Delta f_1$ passed by filter 40 during the interval of operation being considered excites the phase discriminator 28 which, of course, is shown in Fig. 2 of the above referred to Hawkins and Koeppel patent. The reference signal of frequency $\Delta f_1$ passed by the filter 41 during this interval of operation is applied to a resolver or rotating transformer of the type identified as 47 in Fig. 3 of the Hawkins and Koeppel patent. As is clearly described in the latter patent, the phase discriminator and resolver cooperate with a servo motor 45 to form a controlling servo or follow up circuit for the indication appearing on the phase indicator 44. Thus, the phase discriminator functions to produce a direct current output signal the amplitude and polarity of which are a function of the phase relationship between the two signals respectively supplied to the phase discriminator from the band pass filter 40 and the resolver 47. The direct current output signal from the discriminator is applied to the motor 45 in order to rotate the indicator 46 and at the same time to drive the rotor of the control transformer 47 in the proper direction to bring the phase of the signal produced by this rotor winding into a phase relationship with respect to the position indicating signal passed by the filter 40 such that the driving voltage applied to the motor 45 will become zero. Consequently, the motor 45 and the indicator 46 will remain at rest whenever the phase relationship between the two signals applied to the input terminals of the phase discriminator is such that zero voltage is developed by the phase discriminator. This condition prevails only when the signal voltages applied to the discriminator network are displaced in phase by 90°. Thus, when the phase of the position indicating heterodyne signal passed by the filter 40 shifts due to movement of the mobile receiver unit 13, the phase discriminator develops a direct current signal of proper polarity to rotate the motor 45 in a direction to adjust the rotor or control transformer 47 and thereby vary the phase of the signal voltage applied to the phase discriminator from the resolver so as to again establish a 90° phase transversal between the two input signals to the phase discriminator. As a result of the described operation of the phase indicator 44, the pointer 46 will at all times indicate the position of the mobile receiver unit 13 relative to a pair of isophase lines as herebefore explained, while the revolution counter associated with the indicator 44 will indicate the number of isophase lines that have been crossed by the mobile receiver unit from the starting point. To simplify the present description, it will be observed that the phase discriminator, the resolver and the servo motor have been assigned the same reference numerals (28, 47 and 45, respectively) in this application as the corresponding elements in the Hawkins and Koeppel patent identified above, thereby indicating the identity of construction between the corresponding elements. For a detailed explanation of the operation of these elements reference may be had to the Hawkins and Koeppel patent.

In view of the foregoing brief explanation of the operation of the phase indicator 44, it will be observed that the resolver or rotating transformer 47 has the effect of adding $$\frac{\pi}{2}$$

radians to the phase angle of the heterodyne signal passed by the filter 40. This is done in order to resolve ambiguity in the servo system between positive and negative angles. Thus, Equations 7*a* and 14*a* when applied to the phase discriminator 28 become:

$$E \cos\left[(w_2-w_1)t+D+\frac{\pi}{2}\right] \quad (7b)$$

and $$E \cos[(w_2-w_1)t+F] \quad (14b)$$

In the phase discriminator 28, the signal represented by Equation 14*b* is both added to and subtracted from that represented by Equation 7*b* to yield:

$$E_{SUM}=E\cos\left[(w_2-w_1)t+D+\frac{\pi}{2}\right]+E\cos[(w_2-w_1)t+F] \quad (17)$$

$$E_{DIFF}=E\cos\left[(w_2-w_1)t+D+\frac{\pi}{2}\right]-E\cos[(w_2-w_1)t+F] \quad (18)$$

Employing trigonometric transformations, Equations 17 and 18 become:

$$E_{SUM}=2E\cos\left[(w_2-w_1)t+\frac{D+F}{2}+\frac{\pi}{4}\right]\cos\left[\frac{D-F}{2}+\frac{\pi}{4}\right] \quad (19)$$

$$E_{DIFF}=2E\sin\left[(w_2-w_1)t+\frac{D+F}{2}+\frac{\pi}{4}\right]\sin\left[\frac{D-F}{2}+\frac{\pi}{4}\right] \quad (20)$$

The signals represented by Equations 19 and 20 are rectified and added in the output of the discriminator. The peak values of the D. C. voltages developed in each half of the discriminator network are a function of $(D-F)$ but not of time. Thus, the D. C. signal supplied to the servo motor 45 from the discriminator 28 is:

$$E_{OUT}=2E\left[\left|\cos\frac{D-F}{2}+\frac{\pi}{4}\right|-\left|\sin\frac{D-F}{2}+\frac{\pi}{4}\right|\right] \quad (21)$$

The servo system will be balanced, that is, the output $E_{OUT}$ of the discriminator will be zero when $D-F=0$ since Equation 21 will then become:

$$2E\left[\cos\frac{\pi}{4}-\sin\frac{\pi}{4}\right]=2E[.707-.707]=0$$

Thus, the servo system is effective to rotate the rotor of the resolver 47 and the pointer 46 of the phase indicator through an angle $(D-F)$ which will be the angle shown on the phase indicator dial. From Equations 15 and 16

$$D-F=\left[\frac{(r_1-r_2)w_1}{v}-\frac{(w_2-w_1)r_2}{v}+(a_2-a_1)\right]-\left[-\frac{(w_2-w_1)r_3}{v}+(d_3+a_3)+(a_2-a_1)\right]$$

Simplifying:

$$D-F=\left[\frac{(r_1-r_2)w_1}{v}+\frac{(r_3-r_2)(w_2-w_1)}{v}-d_3-a_3\right] \quad (22)$$

The first term of Equation 22 represents a true hyperbola which is usually used in position computation, i. e., in the construction of the hyperbolic lines on the chart.

The second term of Equation 22 has, until the present invention, been neglected in position computation and represents what will be referred to as "third frequency error." It is called an error because it causes the phase indicator reading to deviate from a truly hyperbolic variation. The term "third frequency" is applied because the error varies as a function of $(w_2-w_1)$ which is the difference in frequency between the two position indicating signals radiated from the baseline stations 10 and 11. The last two terms of Equation 22 are instrumental phase displacements with $d_3$ representing phase displacement incurred during modulation at the end transmitting station 12 and $a_3$ representing phase errors resulting from variations in the carrier frequencies of the baseline stations 10 and 11.

At this point, it should be observed that $a_1$ and $a_2$ are not actually constant nor does the value $(a_2-a_1)$ remain constant but, since $a_1$, $a_2$ and $(a_2-a_1)$ all disappear from the final phase indicator reading at point P expressed by Equation 22 above, this fact is of no consequence. Thus, if $d_3$ and $a_3$ remain constant the phase indicator reading is a function of position only. If these two terms remain constant, it will be recognized that the initial "zeroing" of the phase indicator readings at the known starting point effectively eliminates them. The third frequency error term, however, varies with the position of the mobile unit and, hence, induces an error in phase indicator readings in all positions of the mobile unit except the initial starting point.

In accordance with an important feature of the present invention, the effect of the displacements represented by the terms $d_3$ and $a_3$ is eliminated by employing the automatic phase control equipments 35 and 37 and the automatic frequency control circuits 51 and 52 at the end transmitting stations 11 and 12 as illustrated in Figs. 2, 3 and 4 of the drawings. It will be recalled that the term $d_3$ has been employed to cover phase displacements introduced by the reference signal relay station. The term thus represents displacements resulting from such factors as variations in the index of modulation of the reference signal, use of filters having different physical and electrical characteristics introducing variations in $d_3$. These factors and other displacements of unknown origin are substantially nullified by the use of the automatic phase control equipments 35 and 37 at the end stations 11 and 12, respectively. This phase control equipment, as is illustrated in Figs. 3 and 4, provides circuits for sampling the output of the reference receiver detector and comparing this output with that obtained from a second receiver, consisting of a tuned circuit and a crystal detector, tuned to the carrier frequency of the end station for demodulating the carrier to provide a signal containing the displacement $d_3$. The outputs from the two receivers are passed through matched band pass filters to a phase discriminator which provides a polarized direct current signal output the polarity and amplitude of which are functions of the direction and amount of displacement $d_3$ present in the signal supplied by the crystal receiver. The output of the phase discriminator is supplied to a servo system which drives the rotor of a resolver or rotating transformer to change the phase of the reference signal being modulated upon the relay station carrier until the output of the discriminator is reduced to zero, thus eliminating the $d_3$ displacement from the reference signal relayed to the mobile receiver. Since the equations derived above pertain to the interval when the end transmitting station 12 is functioning as a link transmitter or as a reference signal relay station, the equipment provided at this transmitting station to effect the elimination of the displacement $d_3$ will be considered first. This equipment is illustrated in Fig. 4 and includes a crystal receiver 55 consisting of a radio frequency section tuned to a frequency $f_3$ to accept the carrier wave radiated from the end station 12 and a crystal detector for demodulating the carrier wave accepted by the receiver 55 during those intervals when the oscillator 24 at the center transmitter 10 is operative. Thus, during the latter intervals the crystal receiver 55 demodulates the accepted carrier wave and produces a beat frequency or heterodyne signal of frequency $\Delta f_1$ which may contain the displacement $d_3$ and, hence, the output from the crystal receiver has been designated as $(\Delta f_1+d_3)$. This output signal is passed through an automatic level control circuit 56 and through a band pass filter 57 to a phase discriminator 58. The latter discriminator is also excited by the beat frequency signals developed in the detector circuit of the reference receiver 36, which are passed through an automatic level control circuit 59 and through a band pass filter 60. The automatic level control circuits 56 and 59 are of conventional construction and are so designed that the signals passed to the discriminator 58 are of equal amplitude. The band pass filters 57 and 60 are tuned to pass signals of frequency $\Delta f_1$ and are matched so that the equality of amplitude of the signals passed by the automatic level control circuits 56 and 59 is not disturbed. Thus, the phase discriminator 58 is excited by signals of substantially equal amplitude and frequency, which may differ slightly in phase due to the presence of the $d_3$ displacements introduced at the relay transmitter 12. The phase discriminator, which is likewise of conventional construction, responds to the two input signals to produce a polarized direct current output, the polarity and amplitude of which are functions of the direction and magnitude of the $d_3$ displacements. This polarized signal output is applied to a servo or direct current motor 61 having an output shaft 62 connected to the rotor of a resolver or rotating transformer 63. The polarity of the output signal from the phase discriminator 58 determines the direction of drive of the servo motor 61. The stator of the resolver 63 is supplied with the beat frequency signals detected by the receiver 36 after passage through an automatic level control circuit 64 and through a band pass filter 65 tuned to pass signals having frequencies of $\Delta f_1$. The rotor of the resolver 63 thus assumes and is maintained at an angle corresponding to the displacement $d_3$ with the result that the latter displacement is maintained constant. The resolver output is, of course, passed through an amplifier 66 to the modulator 21 for amplitude modulation as a reference signal upon the carrier wave radiated from the end transmitting station 12. Thus, the displacement $d_3$ in the signal applied to the modulator 21 will remain constant and, as a consequence, will have no effect on the phase indications provided at the mobile receiver 13. The automatic phase control equipment 35 provided at the end transmitter 11 is, of course, effective during the intervals when the oscillator 25 at the center station is operative and this equipment is substantially the same as that provided at the end transmitter 12, the only difference being that the crystal receiver 55a and the band pass filters 57a, 60a and 65a are tuned to the appropriate frequencies.

As illustrated in Figs. 3 and 4, the end stations also include automatic frequency control circuits 51 and 52 for maintaining constant the factor represented by the term $a_3$ in Equation 22. It will be recalled that the latter displacements are caused by variations in the frequencies of the signals radiated from the system transmitters and are not limited in magnitude. These displacements may be maintained constant by holding the beat frequencies between the carrier wave pairs constant and, to this end, the modulated signal received at each of the end transmitting stations from the other end station may be demodulated to obtain a signal for comparison with the output of a standard frequency generator for producing signals of constant frequency equal to the desired beat frequency signal. Such a comparison may be effected in a frequency discriminator circuit which provides a polarized direct current error signal the polarity and amplitude of which are functions of the direction and magnitude of deviation of the detected modulation signal from the standard frequency. The resulting direct current error signal is utilized to derive a servo motor having its output shaft connected to a tuning condenser or the like in the carrier wave generator or oscillator at the end transmitter. Thus, the frequencies of the wave generated by the end transmitting stations may be controlled to maintain the beat frequencies between the carrier wave pairs substantially constant.

Considering first the automatic frequency control circuit 51 illustrated in Fig. 3, which is effective at the end transmitter 11 during the intervals when the oscillator 24 is operative, this circuit comprises a frequency discriminator 69 excited by the modulation signals produced from the wave received from the end station 12 and appearing at the output of the detector circuit in the reference receiver 34, which signals are passed through an automatic level control 70 and through a band pass filter 71 tuned to pass signals of frequency $\Delta f_1$. The output of the filter 71 may contain the $a_3$ displacements and, accordingly, this output has been designated as $(\Delta f_1 + a_3)$, in which $a_3$ may be either a positive or negative displacement added to or subtracted from the desired beat frequency $\Delta f_1$. The frequency discriminator 69 is also excited by the signal output from a standard frequency generator or oscillator 72 developing signals of constant frequency equal to $\Delta f_1$. If the two signals supplied to the frequency discriminator 69 are equal in frequency, the output of the discriminator is, of course, zero and no signal is applied to the servo motor 73. When, however, the signal supplied from the band pass filter 71 differs in frequency from the output of the oscillator 72, the phase discriminator 69 develops a polarized direct current signal the polarity and amplitude of which are functions of the direction and magnitude of deviation of the signal from the filter 71 from the desired beat frequency $\Delta f_1$. The polarized output signal from the discriminator 69 drives a servo motor 73, which is connected through shaft 74 to a variable tuning condenser or the like controlling the output frequency of the oscillator 16, with the result that the frequency of the carrier wave radiated from the end transmitter is adjusted to maintain the beat frequency $\Delta f_1$ substantially constant. Thus, the automatic frequency control equipment 51 may be employed to control the frequency of the carrier wave radiated from the end transmitter 11 so that the heterodyne signal $\Delta f_1$ is maintained constant within one cycle.

The automatic frequency control circuit 52 provided at the end transmitter 12 for controlling the carrier wave frequency radiated from the latter end transmitter in order to maintain the beat frequency $\Delta f_3$ constant is illustrated in Fig. 4. The equipment employed at the end transmitter 12 is identical to that employed at the end transmitter 11, except that a band pass filter 71a tuned to pass frequencies of $\Delta f_3$ is substituted for the band pass filter 71 and a standard frequency generator 72a developing signals of frequency $\Delta f_3$ is employed in place of the standard frequency generator 72. In all other respects the elements comprising the automatic frequency control circuits employed at the end transmitter 12 operate in a manner identical to those employed at the end transmitter 11.

From Equation 22, it can be seen that the third frequency error term can be eliminated by reducing the factor $(r_3 - r_2)$ to zero, that is, by relaying the reference signal from one of the baseline stations 10 or 11 instead of from the remotely positioned transmitter 12. A system in which the third frequency error problem has been solved by so radiating the reference signal is disclosed in the inventor's copending application Serial No. 616,332, filed simultaneously herewith and assigned to the same assignee as the present invention. However, in many systems presently in use the third frequency error problem cannot be solved so easily which gives rise to the need for the apparatus of the present invention. Moreover, in many instances, those systems which employ link transmitters spaced from the baseline stations for relaying the reference signals possess a number of advantages with respect to receiver blocking problems, economy of equipment and frequency channels and the like over systems in which the reference signals are relayed from one of the baseline stations. In those systems, as, for example, the system shown in the Hawkins and Finn Patent No. 2,513,317 identified above, wherein it is impossible or not desirable to relay the reference signals from one of the baseline stations, the third frequency error can be reduced or minimized by relaying the highest frequency reference signal from the end station with the shortest baseline and by relaying the lowest frequency reference signal from the end station with the longest baseline.

As previously mentioned, the third frequency errors are generally not large, but particularly in areas where the pattern of intersecting hyperbolic, isophase lines are characterized by high lane expansion and low intersection angles, these errors could amount to considerable displacement of the indicated position from the actual position. Moreover, in those operations such as geophysical surveys to locate the optimum site for drilling an oil well where relatively small errors could prove disastrous, the third frequency errors may create a real problem. Therefore, in accordance with an important feature of the present invention, the third frequency error correction devices 48 and 49 provided at the mobile receiver unit are designed to eliminate or minimize the third frequency errors. These devices may take several forms as illustrated in Figs. 5, 6 and 7. Referring first to the electrical system illustrated in Fig. 5, it will be recalled that the signals developed by the receivers 38 and 39 are expressed by Equations 7 and 14, respectively. If the filters 40 and 41 are identical and have zero phase shift at the passband frequency $(w_2-w_1)$ which, for convenience, will hereinafter be represented as $n$, then the signal emerging from filter 40 is still expressed by Equation 7 and that from filter 41 is expressed by Equation 14. It will also be recalled that the phase discriminator 28 is so designed as to produce a null or zero signal output when the two signals supplied to its input terminals are angularly separated by 90° or $$\frac{\pi}{2}$$

radians. Thus, when the signals are supplied to the discriminator 28, the null condition either exists or it is obtained immediately from the servo system by the addition of an initial angle $B_0$ being added in the resolver 47 via the shaft connection **45*b* from the motor 45**, thereby to satisfy the equation:

$$[\text{Equation } 7+B_0]-\text{Equation } 14=\frac{\pi}{2}$$

or $$[\text{Equation } 7-\text{Equation } 14]+B_0=\frac{\pi}{2}$$

The phase discriminator 28 performs the subtraction in the manner previously described and yields the following:

$$\frac{(r_1-r_2)w_1}{v}+\frac{(r_3-r_2)n}{v}-(d_3+a_3)+B_0=\frac{\pi}{2} \quad (23)$$

which is like Equation 22 derived above.

As indicated above, the automatic frequency control equipment and the automatic phase control circuits provided at each of the end stations maintain the terms $d_3$ and $a_3$ constant or substantially so. The term $B_0$ includes the differences or unbalances in the circuits following the receivers 38 and 39 as well as the angular difference between Equations 7 and 14.

Collecting all of the constant angles of Equation 23 on one side of the equation and employing an angle $B_1$ to account for subsequent movements of the mobile receiver unit which will induce a corresponding rotation of the motor shaft **45*b*** yields:

$$\frac{(r_1-r_2)w_1}{v}+\frac{(r_3-r_2)n}{v}+B_1=\frac{\pi}{2}+d_3+a_3-B_0 \quad (24)$$

Since the right-hand side of Equation 24 contains only constants, it is apparent that any changes in $r_1$, $r_2$ and $r_3$ as a result of movement of the mobile receiver unit 13 must be accounted for by an equal change in $B_1$ or $$B_1=\frac{(r_1-r_2)w_1}{v}+\frac{(r_3-r_2)n}{v} \quad (25)$$

As previously indicated, the first term of Equation 25 represents a truly hyperbolic function and may be used in preparing the charts referred to above, while the second term represents the third frequency errors.

By a similar process it can be shown that the signals developed by receivers 38 and 39 during the second interval of operation previously described take the form of:

$$E_P \cos\left[(w_4-w_3)t+\frac{(r_3-r_2)w_1}{v}-\frac{(w_4-w_3)r_2}{v}+(\alpha_2'-\alpha_1')\right] \quad (7')$$

and $$E_R \cos\left[(w_4-w_3)t+\frac{(w_4-w_3)r_1}{v}+d_3'+a_3')+(\alpha_2'-\alpha_1')\right] \quad (14')$$

in which $w_4$ and $w_3$ are the radian frequencies respectively radiated from the center transmitter 10 and the end transmitter 12 during the second interval and $\alpha_2'$, $\alpha_1'$, $d_3'$ and $a_3'$ are the displacements discussed previously which are present during the second interval. Equations 7′ and 14′ when applied to the phase discriminator 28′ and its associated servo system yield the following:

$$B_2=\frac{(r_3-r_2)w_3}{v}+\frac{(r_1-r_2)n'}{v} \quad (26)$$

in which $n'=(w_4-w_3)$ and $B_2$ is, of course, the angular variation of the servo motor shaft **45*b* introduced to the resolver 47*b* to account for movement of the mobile receiver unit with respect to the hyperbolic isophase lines having foci at the stations 10 and 12**. Equations 25 and 26 may be written together for comparison:

$$B_1=\frac{(r_1-r_2)w_1}{v}+\frac{(r_3-r_2)n}{v} \quad (25)$$

$$B_2=\frac{(r_3-r_2)w_3}{v}+\frac{(r_1-r_2)n'}{v} \quad (26)$$

The first term of Equation 26 contains the factor $(r_3-r_2)$ multiplied by a constant and the third frequency error or second term of Equation 25 contains the same factor multiplied by a different constant. Similarly, the third frequency error term of Equation 26 and the first term of Equation 25 both contain the factor $r_1-r_2$ multiplied by different constants in each case. The term $$\frac{(r_3-r_2)w_3}{v}$$

accounts for virtually all of the angular rotation $B_2$ of the shaft **45*b*′** and to convert this shaft rotation to the corrective motion it is necessary to divide the angular rotation $B_2$ by a factor $$\frac{w_3}{v}$$

which may be accomplished by a reduction gear, and to multiply the resulting movement by a factor $$\frac{n}{v}$$

which may be performed by a "step-up" gear. This multiplication and divison may be accomplished by a single gear train having a ratio of $$\frac{n}{w_3}$$

which is the gear in to out ratio, or, since $n$ is much smaller than $w_3$, the reciprocal $$\frac{w_3}{n}$$

may be used to indicate the out to in gear ratio. Thus, as illustrated in Fig. 5, the shaft 45b' may be used to drive a gear train or gearing indicated at 80 to provide an angular correction which may be supplied to the resolver 47a in order to vary the phase of the reference signal passing to the phase discriminator 28 by an amount corresponding to the third frequency error term of Equation 25. The resolver 47a, of course, algebraically combines the corrective term received from gearing 80 via shaft 80a with the incoming reference signal from the band pass filter 41 so that the third frequency errors are effectively eliminated from the indications appearing upon the phase indicator 44.

Similarly, the shaft 45b may be employed to drive a gear train 81 having a gear out to in ratio of $$\frac{w_1}{n'}$$

in order to provide corrective rotation to be supplied to the resolver 47b via shaft 81a. The resolver 47b combines the corrective signal with the incoming reference signal passed by filter 42 with the result that the third frequency error is eliminated from the output of the phase indicator 50. At first glance, it would appear that the entire angles represented by $B_1$ and $B_2$ are being divided down by the gear trains 81 and 80, respectively, but it should be observed that the third frequency error term is being corrected so that only the first terms of Equations 25 and 26 exist.

In the embodiment of the invention illustrated in Fig. 6 the third frequency error correction is effected by rotating the resolvers 47 and 47' operating upon the reference signals in the form of the invention illustrated in Fig. 5. Specifically, a mobile receiver unit 13a is illustrated in Fig. 6 wherein the output of the bearing 80 appearing upon shaft 80a may be employed to drive an additional variable gearing 82 which may be manually adjusted by means of a hand crank 83 in order to "zero" the reading appearing upon the phase indicator 44 when the mobile receiver unit 13a is positioned at its known initial starting point. Rotation of the crank 83, of course, varies the gearing 82 and, hence, controls the rotation of the output shaft 82a drivingly connected to the casing of the resolver 47. The casing of the latter resolver is thus rotated through an angle corresponding to the third frequency error term in Equation 25 and the resolver effectively subtracts this correction term from the incoming signal from the filter 40, thereby to eliminate the third frequency errors from the readings provided by the phase indicator 44.

In similar manner, the ouput shaft 81a of the gearing 81 drives a shaft 84a drivingly connected to the case of resolver 47' through a gear box 84 which is also manually adjustable by rotation of hand crank 85. The casing of resolver 47' is thus rotated through an angle corresponding to the third frequency error term in Equation 26 with the result that this resolver effectively subtracts the third frequency correction from the beat signal passed by filter 43, thereby eliminating third frequency errors from the indications appearing upon the phase indicator 50. In view of the foregoing description, it will be recognized that both of the hand cranks 83 and 85 are manually adjusted when the mobile receiver unit 13a is stationed at its known starting point until the readings of the phase indicators 44 and 50 correspond to the hyperbolic isophase lines on the chart intersecting at the known location. Thereafter, the resolvers 47 and 47' function in the manner described above to effect the elimination of third frequency errors from their respective phase indicator readings.

In the embodiment of the invention illustrated in Fig. 7, the third frequency corrections are subtracted by means of mechanical differentials 86 and 87. Thus, the third frequency correction appearing upon shaft 80a is employed to drive one side of the mechanical differential 86, the other side of which is driven by the output shaft 45b of the servo motor 45. The angular rotation of the latter shaft, as is indicated in Fig. 7, corresponds to Equation 25 and includes a third frequency error term. The mechanical differential 86 effectively subtracts the angular rotation of shaft 80a from that of shaft 45b and produces an output appearing upon shaft 86a which drives the pointer 46 of the phase indicator 44 with the result that the indications provided by the latter pointer are free from third frequency error. In similar manner, the mechanical differential 87 subtracts the correction angle appearing upon shaft 81a from the angular rotation of shaft 45b' to eliminate third frequency errors from the indications provided by the pointer 46' of the phase indicator 50.

All three of the arrangements illustrated in Figs. 5, 6 and 7 are designed for use in conjunction with charts or maps having isophase lines spaced apart along the baselines by a distance corresponding to one-half wave length of the frequency of the wave radiated from one of the baseline stations, i. e., the frequency $w_1$ in Equation 25 and the frequency $w_3$ in Equation 26. Also in deriving Equations 25 and 26 it has been assumed that $w_2$ is greater than $w_1$ and that $w_2$ is also greater than $w_3$. If, on the other hand, $w_2$ is less than $w_1$ or if $w_2+n=w_1$, $$B_1=\frac{(r_1-r_2)w_1}{v}-\frac{(r_3-r_2)n}{v} \qquad (27)$$

since the sign of $n$ will change from positive to negative. Substituting $w_2+n$ for $w_1$ in Equation 27 yields:

$$B_1=\frac{(r_1-r_2)w_2}{v}+\frac{(r_1-r_3)n}{v} \qquad (28)$$

Thus, it can be seen that either of the baseline frequencies can be used as the computation frequency in preparing the charts or maps. However, most of the charts presently prepared and in use employ the average frequency $$\left(\frac{w_1+w_2}{2}\right)$$

as the computation frequency and, in order to prevent these charts and the large amount of survey information pertinent thereto from becoming obsolete, it would be desirable to provide a system for eliminating or minimizing the third frequency error while at the same time using the average frequency in the computations. Such a system is illustrated in Fig. 8 but, before considering the equipment there shown, it should be observed that the third frequency error present in the frequency $$\left(\frac{w_1+w_2}{2}\right)$$

commonly used for mapping may be found by adding Equations 27 and 28 together to yield $$B_1=\frac{r_1-r_2}{v}\left(\frac{w_1+w_2}{2}\right)+\left(\frac{r_1-2r_3+r_2}{v}\cdot\frac{n}{2}\right) \qquad (29)$$

or if $w_2$ is greater than $w_1$ and $(w_2=w_1+n)$ then $$B_1=\frac{r_1-r_2}{v}\left(\frac{w_1+w_2}{2}\right)-\left(\frac{r_1-2r_3+r_2}{v}\cdot\frac{n}{2}\right) \qquad (30)$$

The first term in each of Equations 29 and 30 represents a truly hyperbolic function varying as a function of the average baseline frequency while the second term of each equation represents third frequency error.

Equation 29 may be rearranged as:

$$B_1=\frac{(r_1-r_2)}{v}\left(\frac{w_1+w_2}{2}\right)+\left[\left(\frac{r_1-r_2}{v}\right)\frac{n}{2}-\left(\frac{r_3-r_2}{v}\right)\frac{n}{2}\right] \quad (31)$$

During the second interval of operation when the reference signal is being radiated from the end transmitting station 11 a similar relationship is obtained as follows:

$$B_1'=\frac{(r_3-r_2)}{v}\left(\frac{w_3+w_4}{2}\right)+\left[\frac{(r_3-r_2)}{v}\frac{n'}{2}-\frac{(r_1-r_2)}{v}\frac{n'}{2}\right] \quad (32)$$

in which $w_3$ and $w_4$ are the frequencies of the waves radiated from the baseline stations and $n'$ is the difference frequency.

Thus, as illustrated in Fig. 8, in those systems wherein the average of the baseline frequencies is employed in mapping the angular rotations of the shafts **45*b* and 45*b'* are respectively represented by Equations 31 and 32. The shaft 45*b* is drivingly connected to a pair of gear trains 90 and 91** having gear ratios of $$\frac{w_1+w_2}{n'} \text{ and } \frac{w_1+w_2}{n}$$

respectively, while the shaft **45*b'* is drivingly connected to gear trains 92 and 93** having gear ratios of $$\frac{w_3+w_4}{n'} \text{ and } \frac{w_3+w_4}{n}$$

respectively. Virtually all of the rotation of the shaft **45*b'* is represented by the first term of Equation 32 and in like manner the first term of Equation 31 expresses practically the entire angular rotation of shaft 45*b*. Thus, for all practical purposes, the output of the gearing 91 which appears upon shaft 91*a*** is represented by:

$$\frac{(r_1-r_2)}{v}\cdot\frac{n}{2}$$

while the output of gearing 93 appearing upon shaft **93*a*** is represented by:

$$\frac{(r_3-r_2)}{v}\cdot\frac{n}{2}$$

In deriving the above expressions the effect of the gearings upon the last terms of Equations 31 and 32 has been disregarded, due to the fact that the rotation expressed by these terms is negligible.

The shafts **91*a* and 93*a* cooperate to drive a mechanical differential 94 which effectively subtracts the two input angular rotations and produces upon shaft 94*a*** an angular movement corresponding to:

$$\left[\frac{r_1-r_2}{v}\cdot\frac{n}{2}-\frac{r_3-r_2}{v}\cdot\frac{n}{2}\right]$$

which is the third frequency term of Equation 31. This third frequency correction angle is subtracted from the angular rotation of shaft **45*b* in a mechanical differential 95 so that the output shaft 95*a* which drives the pointer 46** is substantially free from the third frequency errors.

Similarly, mechanical differential 96 subtracts the angular rotations of output shafts **90*a* and 92*a* of the gear trains 90 and 92, respectively, and produces upon shaft 96*a*** an angular rotation expressed by:

$$\left[\frac{r_3-r_2}{v}\cdot\frac{n'}{2}-\frac{r_1-r_2}{v}\cdot\frac{n'}{2}\right]$$

which corresponds to the third frequency error term of Equation 32. This third frequency error correction angle is, of course, subtracted from the angular rotation of the shaft **45*b'* in a mechanical differential 97 having its output shaft drivingly connected to the pointer 46' of the phase indicator 50** so that the third frequency errors are substantially eliminated from the phase meter readings. The subtractions performed by the mechanical differentials shown in Fig. 8 could also be accomplished by the use of resolvers in the manner shown in Fig. 6, but to simplify the description this has not been shown in the drawings.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. In a radio position determining system of the hyperbolic continuous wave type wherein at least two position indication signals are radiated to a mobile receiver unit from a pair of spaced transmitting points and a reference signal derived from said position indicating signals is transmitted from a link transmitting station spaced from said transmitting points, means at the mobile receiver unit responsive to the position indicating signals and to the reference signal for providing an indication of the location of the mobile receiver unit relative to said pair of transmitting points, and means at the mobile receiver unit for reducing or eliminating from said position indication third frequency errors resulting from the transmission of the reference signal from a point spaced from said pair of transmitting points.

2. In a radio position determining system of the hyperbolic continuous wave type for locating the position of a mobile receiver unit relative to a plurality of fixed spaced apart transmitting stations, means for radiating a first pair of position indicating signals from a first pair of said stations, means for radiating a second pair of position indicating signals from a second pair of said stations, means for transmitting a first reference signal derived from the first pair of position indicating signals from a point spaced from the first pair of stations, means for transmitting a second reference signal derived from the second pair of position indicating signals from a point spaced from the second pair of stations, means at the mobile receiver unit responsive to the position indicating signals and to the reference signals for providing first and second position indications respectively representative of the location of the mobile receiver unit relative to the first and second pair of stations, and means at the mobile receiver unit for reducing or eliminating third frequency errors in said position indications resulting from the transmission of each of the reference signals from a point spaced from the points of transmission of its associated pair of position indicating signals.

3. In a radio position determining system of the hyperbolic continuous wave type for locating the position of a mobile receiver unit relative to a plurality of fixed spaced apart transmitting stations, means for radiating a first pair of position indicating signals from a first pair of said stations, means for radiating a second pair of position indicating signals from a second pair of said stations, means for transmitting a first reference signal derived from the first pair of position indicating signals from a point spaced from the first pair of stations, means for transmitting a second reference signal derived from the second pair of position indicating signals from a point spaced from the second pair of stations, means at the mobile receiver unit responsive to the first pair of position indicating signals and to the first reference signal for providing a position indication representative of the location of the mobile receiver unit relative to the first pair of stations, and means at the mobile receiver unit responsive to the second pair of position indicating signals and to the second reference signal for reducing or eliminating from said position indication third frequency errors resulting from the transmission of the first reference signal from a point spaced from the first pair of stations.

4. In a radio position determining system of the hyperbolic continuous wave type for locating the position of a mobile receiver unit relative to a plurality of fixed spaced apart transmitting stations, means for radiating a first pair of position indicating signals from a first pair of said stations, means for radiating a second pair of position indicating signals from a second pair of said stations, means for transmitting a first reference signal derived from the first pair of position indicating signals from a point spaced from the first pair of stations, means for transmitting a second reference signal derived from the second pair of position indicating signals from a point spaced from the second pair of stations, means at the mobile receiver unit responsive to the first pair of position indicating signals and to the first reference signal for providing a first position indication representative of the location of the mobile receiver unit relative to the first pair of stations, means at the mobile receiver unit responsive to the second pair of position indicating signals and to the second reference signal for providing a second position indication representative of the location of the mobile receiver unit relative to the second pair of stations, means responsive to the second pair of position indicating signals and to the second reference signal for reducing or eliminating said first position indication third frequency errors resulting from the transmission of said first reference signal from a point spaced from the first pair of stations, and means at the mobile receiver unit responsive to the first pair of position indicating signals and to the first reference signal for reducing or eliminating from said second position indication third frequency errors resulting from the transmission of the second reference signal from a point spaced from the second pair of stations.

5. In a radio position determining system of the hyperbolic continuous wave type for locating the position of a mobile receiver unit relative to a plurality of fixed spaced apart transmitting stations, means for radiating a first pair of position indicating signals from a first pair of said stations, means for radiating a second pair of position indicating signals from a second pair of said stations, means for transmitting a first reference signal derived from the first pair of position indicating signals from a point spaced from the first pair of stations, means for transmitting a second reference signal derived from the second pair of position indicating signals from a point spaced from the second pair of stations, means at the mobile receiver unit responsive to all four of the position indicating signals and to both of the reference signals for providing a first position indication representative of the location of the mobile receiver unit relative to the first pair of stations and for minimizing or eliminating from said first position indication third frequency errors resulting from the transmission of the first reference signal from a point spaced from the first pair of stations, and means jointly responsive to all four of the position indicating signals and to both of the reference signals for providing a second position indication representative of the location of the mobile receiver unit relative to the second pair of stations and for eliminating or reducing third frequency errors resulting from transmission of the second reference signal from a point spaced from the second pair of stations.

6. In a radio position determining system of the hyperbolic continuous wave type for locating the position of a mobile receiver unit relative to a plurality of fixed spaced apart transmitting stations, means for radiating a first pair of position indicating signals from a first pair of said stations, means for radiating a second pair of position indicating signals from a second pair of said stations, means for heterodyning the first pair of position indicating signals to produce a first difference frequency signal and for transmitting a first reference signal derived from the first difference frequency signal as a modulation component upon a carrier wave radiated from a point spaced from the first pair of stations, means for heterodyning the second pair of position indicating signals to produce a second difference frequency signal and for transmitting a second reference signal derived from the second difference frequency signal as a modulation component upon a carrier wave radiated from a point spaced from the second pair of stations, receiver means at the mobile receiver unit for heterodyning the position indicating signals to develop third and fourth difference frequency signals and for detecting the reference signals, a first phase indicator responsive to the first reference signal and to the third difference frequency signal for providing a first position indication representative of the location of the mobile receiver unit relative to the first pair of stations, and means at the mobile receiver unit responsive to the second reference signal and to the fourth difference frequency signal for reducing or eliminating from said first position indication third frequency errors resulting from the transmission of the first reference signal from a point spaced from the first pair of stations.

7. In a radio position determining system of the hyperbolic continuous wave type for locating the position of a mobile receiver unit relative to a plurality of fixed spaced apart transmitting stations, means for radiating a first pair of position indicating signals from a first pair of said stations, means for radiating a second pair of position indicating signals from a second pair of said stations, means for heterodyning the first pair of position indicating signals to produce a first difference frequency signal and for transmitting a first reference signal derived from the first difference frequency signal as a modulation component upon a carrier wave radiated from a point spaced from the first pair of stations, means for heterodyning the second pair of position indicating signals to produce a second difference frequency signal and for transmitting a second reference signal derived from the second difference frequency signal as a modulation component upon a carrier wave radiated from a point spaced from the second pair of stations, receiver means at the mobile receiver unit for heterodyning the position indicating signals to develop third and fourth difference frequency signals and for detecting the reference signals, a first phase indicator responsive to the first reference signal and to the third difference frequency signal for providing a first position representative of the location of the mobile receiver unit relative to the first pair of stations, means responsive to the second reference signal and to the fourth difference frequency signal for providing a second position indication representative of the location of the mobile receiver unit relative to said second pair of stations, and means at the mobile receiver unit for reducing or eliminating from said first and second position indications third frequency errors resulting from the transmission of each of the reference signals from a point spaced from the sources of the position indicating signals heterodyned to produce it.

8. In a radio position determining system of the hyperbolic continuous wave type for locating the position of a mobile receiver unit relative to a plurality of fixed spaced apart transmitting stations, means for radiating a first pair of position indicating signals from a first pair of said stations, means for radiating a second pair of position indicating signals from a second pair of said stations, means for heterodyning the first pair of position indicating signals to produce a first difference frequency signal and for transmitting a first reference signal derived from the first difference frequency signal as a modulation component upon a carrier wave radiated from a point spaced from the first pair of stations, means for heterodyning the second pair of position indicating signals to produce a second difference frequency signal and for transmitting a second reference signal derived from the second difference frequency signal as a modulation component upon a carrier wave radiated from a point spaced from the second pair of stations, receiver means at the mobile receiver unit for heterodyning the position indicating signals to develop third and fourth difference frequency signals and for detecting the reference signals, a first phase indicator responsive to the first reference signal and to the third difference frequency signal for providing a first position indication representative of the location of the mobile receiver unit relative to the first pair of stations, means responsive to the second reference signal and to the fourth difference frequency signal for providing a second position indication representative of the location of the mobile receiver unit relative to said second pair of stations, means at the mobile receiver unit responsive to the second reference signal and to the fourth difference frequency signal for reducing or eliminating from said first position indication third frequency errors resulting from the transmission of the first reference signal from a point spaced from the first pair of stations, and means at the mobile receiver unit jointly responsive to the first reference signal and to the third difference frequency signal for eliminating or reducing from said second position indication third frequency errors resulting from the transmission of said second reference signal from a point spaced from the second pair of stations.

9. In a radio position determining system of the hyperbolic continuous wave type for locating the position of a mobile receiver unit relative to a plurality of fixed spaced apart transmitting stations, means for radiating a first pair of position indicating signals from a first pair of said stations, means for radiating a second pair of position indicating signals from a second pair of said stations, means for heterodyning the first pair of position indicating signals to produce a first difference frequency signal and for transmitting a first reference signal derived from the first difference frequency signal as a modulation component upon a carrier wave radiated from a point spaced from the first pair of stations, means for heterodyning the second pair of position indicating signals to produce a second difference frequency signal and for transmitting a second reference signal derived from the second difference frequency signal as a modulation component upon a carrier wave radiated from a point spaced from the second pair of stations, receiver means at the mobile receiver unit for heterodyning the position indicating signals to develop third and fourth difference frequency signals and for detecting the reference signals, means including a first phase indicator jointly responsive to the first and second reference signals and to the third and fourth difference frequency signals for providing a first position indication representative of the location of the mobile receiver unit relative to the first pair of stations and for reducing or eliminating from said first position indication third frequency errors resulting from the transmission of the first reference signal from a point spaced from the first pair of stations, and means jointly responsive to the first and second reference signals and to the third and fourth difference frequency signals for providing a second position indication representative of the location of the mobile receiver unit relative to the second pair of stations and for reducing or eliminating from said second position indication third frequency errors resulting from the transmission of said second reference signal from a point spaced from the second pair of stations.

10. In a radio position determining system of the hyperbolic continuous wave type for locating the position of a mobile receiver unit relative to a plurality of fixed spaced apart transmitting stations, means for radiating first and second position indicating signals of different frequency from a first pair of said stations, means for radiating third and fourth position indicating signals of still different frequency from a second pair of said stations, means for heterodyning the first and second position indicating signals to produce a first difference frequency signal and for transmitting a first reference signal derived from the first difference frequency signal as a modulation component upon a carrier wave radiated from a point spaced from the first pair of stations, means for heterodyning the third and fourth position indicating signals to produce a second difference frequency signal and for transmitting a second reference signal derived from the second difference frequency signal as a modulation component upon a carrier wave radiated from a point spaced from the second pair of stations, receiver means at the mobile receiver unit for heterodyning the position indicating signals in pairs to develop third and fourth difference frequency signals and for detecting the reference signals, a first phase indicator responsive to the first reference signal and to the third difference frequency signal for providing a first position indication representative of the location of the mobile receiver unit relative to the first pair of stations, and means at the mobile receiver unit responsive to the second reference signal and to the fourth difference frequency signal for producing a control signal, and means responsive to said control signal for affecting the phase indications provided by said first phase indicator in order to eliminate or reduce third frequency errors resulting from the transmission of the first reference signal from a point spaced from the first pair of stations.

11. In a radio position determining system of the hyperbolic continuous wave type for locating the position of a mobile receiver unit relative to a plurality of fixed spaced apart transmitting stations, means for radiating first and second position indicating signals from a first pair of said stations, means for radiating third and fourth position indicating signals from a second pair of said stations, means for heterodyning the first and second position indicating signals to produce a first difference frequency signal and for transmitting a first reference signal derived from the first difference frequency signal as a modulation component upon a carrier wave radiated from a point spaced from the first pair of stations, means for heterodyning the third and fourth position indicating signals to produce a second difference frequency signal and for transmitting a second reference signal derived from the second difference frequency signal from a point spaced from the second pair of stations, receiver means at the mobile receiver unit for heterodyning the position indicating signals in pairs to develop third and fourth difference frequency signals and for detecting the reference signals, a first phase indicator responsive to the first reference signal and to the third difference frequency signal for providing a first position indication representative of the location of the mobile receiver unit relative to the first pair of stations, means at the mobile receiver unit responsive to the second reference signal and to the fourth difference frequency signal for producing a first control signal, means responsive to said first control signal for affecting the first position indication in order to reduce or eliminate third frequency errors resulting from the transmission of the first reference signal from a point spaced from the first pair of stations, means responsive to the second reference signal and the fourth difference frequency signal for producing a second position indication representative of the location of the mobile receiver unit relative to the second pair of stations, means responsive to the first reference signal and to the third difference frequency signal for producing a second control signal, and means responsive to the second control signal for affecting the second position indication in order to reduce or eliminate third frequency errors resulting from the transmission of said second reference signal from a point spaced from the second pair of stations.

12. In a wave transmission system of the hyperbolic continuous wave type, means for radiating a pair of position indicating signals from a pair of spaced apart transmitting points, a link transmitting station spaced from said transmitting points, receiving means at the link station for heterodyning the position indicating signals to develop a reference signal, means at the link station for radiating a carrier wave, means for modulating the reference signal upon the carrier wave for space radiation, detecting means at the link station for sampling the modulated carrier wave and reproducing the reference signal, and means jointly responsive to the reproduced reference signal and to the output of said receiving means for maintaining the phase of said reference signal constant.

13. In a wave transmission system of the hyperbolic continuous wave type, means for radiating a pair of position indicating signals from a pair of spaced apart transmitting points, a link transmitting station spaced from said transmitting points, receiving means at the link station for heterodyning the position indicating signals to develop a reference signal, means at the link station for radiating a carrier wave, means for modulating the reference signal upon the carrier wave for space radiation, detecting means at the link station for sampling the modulated carrier wave and reproducing the reference signal, means for comparing the reproduced reference signal with the output of said receiving means to develop a control signal, and means responsive to said control signal for maintaining the phase of said reference signal constant.

14. In a wave transmission system of the hyperbolic continuous wave type, means for radiating a pair of position indicating signals from a pair of spaced apart transmitting points, a link transmitting station spaced from said transmitting points, receiving means at the link station for heterodyning the position indicating signals to develop a reference signal, means at the link station for radiating a carrier wave, means for modulating the reference signal upon the carrier wave for space radiation, detecting means at the link station for sampling the modulated carrier wave and reproducing the reference signal, means jointly responsive to the reproduced reference signal and to the output of said receiving means for developing a control signal, and means responsive to said control signal for controlling the phase of said reference signal prior to modulation upon said carrier wave in order to maintain the phase of said reference signal constant.

15. In a wave signal transmitting system of the hyperbolic continuous wave type, means for continuously radiating first and second position indicating signals, means for alternately radiating third and fourth position indicating signals, said first and third position indicating signals being separated by a first difference frequency and being radiated from spaced apart points, said second and fourth position indicating signals being separated by a second difference frequency and being radiated from spaced apart points, means for heterodyning said first and third position indicating signals to produce said first difference frequency, means for modulating said second position indicating signal with a first reference signal derived from said first difference frequency, means for heterodyning the second and fourth position indicating signals in order to produce said second difference frequency, means for modulating said first position indicating signal with a reference signal derived from said second difference frequency, means for receiving said first position indicating signal and detecting said second reference signal, means responsive to said second reference signal for controlling the frequency of the second position indicating signal in order to maintain the second difference frequency constant, means for receiving the second position indicating signal and for detecting the first reference signal modulated thereon, and means responsive to the first reference signal for controlling the frequency of the first position indicating signal in order to maintain the first difference frequency constant.

16. In a wave signal transmitting system of the hyperbolic continuous wave type, means for continuously radiating first and second position indicating signals, means for alternately radiating third and fourth position indicating signals, said first and third position indicating signals being separated by a first difference frequency and being radiated from spaced apart points, said second and fourth position indicating signals being separated by a second difference frequency and being radiated from spaced apart points, means for heterodyning said first and third position indicating signals to produce said first difference frequency, means for modulating said second position indicating signal with a first reference signal derived from said first difference frequency, means for heterodyning the second and fourth position indicating signals in order to produce said second difference frequency, means for modulating said first position indicating signal with a reference signal derived from said second difference frequency, means for reeciving said first position indicating signal and detecting said second reference signal, means responsive to said second reference signal for developing a first control signal, means responsive to said first control signal for controlling the frequency of the second position indicating signal in order to maintain the second difference frequency constant, means for receiving the second position indicating signal and for detecting the first reference signal modulated thereon, means responsive to the first reference signal for developing a second control signal, and means responsive to the second control signal for controlling the frequency of the first position indicating signal in order to maintain the first difference frequency constant.

17. In a wave signal transmitting system of the hyperbolic continuous wave type, means for continuously radiating first and second position indicating signals, means for alternately radiating third and fourth position indicating signals, said first and third position indicating signals being separated by a first difference frequency and being radiated from spaced apart points, said second and fourth position indicating signals being separated by a second difference frequency and being radiated from spaced apart points, means for heterodyning said first and third position indicating signals to produce said first difference frequency, means for modulating said second position indicating signal with a first reference signal derived from said first difference frequency, means for heterodyning the second and fourth position indicating signals in order to produce said second difference frequency, means for modulating said first position indicating signal with a reference signal derived from said second difference frequency, means for receiving said first position indicating signal and detecting said second reference signal, means for developing a first standard signal having a frequency corresponding to the desired value of the second difference frequency, means for comparing the second reference signal and the first standard signal to develop a first control signal, means responsive to said first control signal for controlling the frequency of the second position indicating signal in order to maintain the second difference frequency constant, means for receiving the second position indicating signal and for detecting the first reference signal modulated thereon, means for developing a second standard signal having a frequency equal to the desired value of the first difference frequency, means for comparing the first reference signal and the second standard signal to develop a second control signal, and means responsive to the second control signal for controlling the frequency of the first position indicating signal in order to maintain the first difference frequency constant.

18. In a wave signal transmitting system of the hyperbolic continuous wave type, means for continuously radiating first and second position indicating signals from first and second spaced apart stations, means for alternately radiating third and fourth position indicating signals from a point spaced from said stations, said first and third position indicating signals being separated by a first difference frequency and said second and fourth position indicating signals being separated by a second difference frequency, means for heterodyning said first and third position indicating signals at said second station to produce said first difference frequency, means at said second station for modulating said second position indicating signal with a first reference signal derived from said first difference frequency, means at the first station for heterodyning the second and fourth position indicating signals in order to produce said second difference frequency, means at said first station for modulating said first position indicating signal with a reference signal derived from said second difference frequency, means at said second station for receiving said first position indicating signal and detecting said second reference signal, means at the second station responsive to said second reference signal for controlling the frequency of the second position indicating signal in order to maintain the second difference frequency constant, means at the first station for receiving the second position indicating signal and for detecting the first reference signal modulated thereon, and means at said first station responsive to the first reference signal for controlling the frequency of the first position indicating signal in order to maintain the first difference frequency constant.

19. In a wave signal transmitting system of the hyperbolic continuous wave type, means for continuously radiating first and second position indicating signals from first and second spaced apart stations, means for alternately radiating third and fourth position indicating signals from a point spaced from both of said stations, said first and third position indicating signals being separated by a first difference frequency and said second and fourth position indicating signals being separated by a second difference frequency, means at said second station for heterodyning said first and third position indicating signals to produce said first difference frequency, means at said second station for modulating said second position indicating signal with a first reference signal derived from said first difference frequency, means at the first station for heterodyning the second and fourth position indicating signals in order to produce said second difference frequency, means at said first station for modulating said first position indicating signal with a reference signal derived from said second difference frequency, means at the second station for receiving said first position indicating signal and detecting said second reference signal, means at the second station for developing a first standard signal having a frequency corresponding to the desired value of the second difference frequency, means jointly responsive to the first standard signal and to the detected second reference signal for producing a first control signal, means responsive to said first control signal for controlling the frequency of the second position indicating signal in order to maintain the second difference frequency constant, means at the first station for receiving the second position indicating signal and for detecting the first reference signal modulated thereon, means at the first station for developing a second standard signal having a frequency corresponding to the desired value of the first difference frequency, means jointly responsive to the second standard signal and to the detected first reference signal for providing a second control signal, and means responsive to said second control signal for controlling the frequency of the first position indicating signal in order to maintain the first difference frequency constant.

20. In a system of the hyperbolic continuous wave type for locating the position of a mobile receiver unit relative to the known location of a plurality of spaced apart transmitting points, means for continuously radiating first and second position indicating signals, means for alternately radiating third and fourth position indicating signals, said first and third position indicating signals being separated by a first difference frequency and being radiated from one pair of said spaced apart points, said second and fourth position indicating signals being separated by a second difference frequency and being radiated from a second pair of said spaced apart points, means for heterodyning said first and third position indicating signals to produce said first difference frequency, means for modulating said second position indicating signal with a first reference signal derived from said first difference frequency, means for heterodyning the second and fourth position indicating signals in order to produce said second difference frequency, means for modulating said first position indicating signal with a reference signal derived from said second difference frequency, means at the mobile receiver unit for heterodyning said position indicating signals in pairs in order to develop said first and second difference frequencies and for detecting the first and second reference signals, means including a first rotatable member jointly responsive to the first reference signal and to the first difference frequency for providing a first indication representative of the location of the mobile receiver unit relative to said one pair of points, means including a second rotatable member jointly responsive to the second reference signal and to the second difference frequency for producing a second indication representative of the location of the mobile receiver unit relative to said second pair of points, means for multiplying the rotation of said first member by a factor dependent upon the ratio of the frequency of the first position indicating signal and the second difference frequency in order to develop a first control signal, and means responsive to the first control signal for affecting the rotation of said second member to reduce or eliminate third frequency errors from said second indication.

21. In a system of the hyperbolic continuous wave type for locating the position of a mobile receiver unit relative to the known location of a plurality of spaced apart transmitting points, means for continuously radiating first and second position indicating signals, means for alternately radiating third and fourth position indicating signals, said first and third position indicating signals being separated by a first difference frequency and being radiated from one pair of said spaced apart points, said second and fourth position indicating signals being separated by a second difference frequency and being radiated from a second pair of said spaced apart points, means for heterodyning said first and third position indicating signals to produce said first difference frequency, means for modulating said second position indicating signal with a first reference signal derived from said first difference frequency, means for heterodyning the second and fourth position indicating signals in order to produce said second difference frequency, means for modulating said first position indicating signal with a reference signal derived from said second difference frequency, means at the mobile receiver unit for heterodyning said position indicating signals in pairs in order to develop said first and second difference frequencies and for detecting the first and second reference signals, means including a first rotatable member jointly responsive to the first reference signal and to the first difference frequency for providing a first indication representative of the location of the mobile receiver unit relative to said one pair of points, means including a second rotatable member jointly responsive to the second reference signal and to the second difference frequency for producing a second indication representative of the location of the mobile receiver unit relative to said second pair of points, means responsive to the rotation of the first member for affecting the rotation of said second member to reduce or eliminate third frequency errors from said second indication, and means responsive to the rotation of the second member for affecting the rotation of the first member in order to reduce or eliminate third frequency errors from said first indication.

22. In a system of the hyperbolic continuous wave type for locating the position of a mobile receiver unit relative to the known location of a plurality of spaced apart transmitting points, means for continuously radiating first and second position indicating signals, means for alternately radiating third and fourth position indicating signals, said first and third position indicating signals being separated by a first difference frequency and being radiated from one pair of said spaced apart points, said second and fourth position indicating signals being separated by a second difference frequency and being radiated from a second pair of said spaced apart points, means for heterodyning said first and third position indicating signals to produce said first difference frequency, means for modulating said second position indicating signal with a first reference signal derived from said first difference frequency, means for heterodyning the second and fourth position indicating signals in order to produce said second difference frequency, means for modulating said first position indicating signal with a reference signal derived from said second difference frequency, means at the mobile receiver unit for heterodyning said position indicating signals in pairs in order to develop said first and second difference frequencies and for detecting the first and second reference signals, means including a first rotatable member jointly responsive to the first reference signal and to the first difference frequency for providing a first indication representative of the location of the mobile receiver unit relative to said one pair of points, means including a second rotatable member jointly responsive to the second reference signal and to the second difference frequency for producing a second indication representative of the location of the mobile receiver unit relative to said second pair of points, and means responsive to the rotation of the first member for affecting the rotation of said second member to reduce or eliminate third frequency errors from said second indication.

23. In a system of the hyperbolic continuous wave type for locating the position of a mobile receiver unit relative to the known location of a plurality of spaced apart transmitting points, means for continuously radiating first and second position indicating signals, means for alternately radiating third and fourth position indicating signals, said first and third position indicating signals being separated by a first difference frequency and being radiated from one pair of said spaced apart points, said second and fourth position indicating signals being separated by a second difference frequency and being radiated from a second pair of said spaced apart points, means for heterodyning said first and third position indicating signals to produce said first difference frequency, means for modulating said second position indicating signal with a first reference signal derived from said first difference frequency, means for heterodyning the second and fourth position indicating signals in order to produce said second difference frequency, means for modulating said first position indicating signal with a reference signal derived from said second difference frequency, means at the mobile receiver unit for heterodyning said position indicating signals in order to develop said first and second difference frequencies and for detecting the first and second reference signals, means including a first rotatable member jointly responsive to the first reference signal and to the first difference frequency for providing a first indication representative of the location of the mobile receiver unit relative to said one pair of points, means including a second rotatable member jointly responsive to the second reference signal and to the second difference frequency for producing a second indication representative of the location of the mobile receiver unit relative to said second pair of points, means for multiplying the rotation of said first member by a factor dependent upon the ratio of the frequency of the first position indicating signal and the second difference frequency in order to develop a first control signal for affecting the rotation of said second member to reduce or eliminate third frequency errors from said second indication, means for multiplying the rotation of said second member by a factor dependent upon the ratio of the frequency of the second position indicating signal and the first difference frequency in order to develop a second control signal, and means responsive to said second control signal for affecting the rotation of the first member in order to reduce or eliminate third frequency errors from said first indication.

24. In a system of the hyperbolic continuous wave type for locating the position of a mobile receiver unit relative to the known location of a plurality of spaced apart transmitting points, means for continuously radiating first and second position indicating signals, means for alternately radiating third and fourth position indicating signals, said first and third position indicating signals being separated by a first difference frequency and being radiated from one pair of said spaced apart points, said second and fourth position indicating signals being separated by a second difference frequency and being radiated from a second pair of said spaced apart points, means for heterodyning said first and third position indicating signals to produce said first difference frequency, means for modulating said second position indicating signal with a first reference signal derived from said first difference frequency, means for heterodyning the second and fourth position indicating signals in order to produce said second difference frequency, means for modulating said first position indicating signal with a reference signal derived from said second difference frequency, means at the mobile receiver unit for heterodyning said position indicating signals in pairs in order to develop said first and second difference frequencies and for detecting the first and second reference signals, means jointly responsive to the first reference signal and to the first difference frequency for providing a first indication representative of the location of the mobile receiver unit relative to said one pair of points, means jointly responsive to the second reference signal and to the second difference frequency for producing a second indication representative of the location of the mobile receiver unit relative to said second pair of points, means jointly responsive to the second reference signal and the second difference frequency for producing a first control signal, means for multiplying said first control signal by a factor dependent upon the ratio of the frequency of the first position indicating signal and the second difference frequency in order to develop a second control signal, and means responsive to the second control signal for reducing or eliminating third frequency errors from said second indication.

25. In a system of the hyperbolic continuous wave type for locating the position of a mobile receiver unit relative to the known location of a plurality of spaced apart transmitting points, means for continuously radiating first and second position indicating signals, means for alternately radiating third and fourth position indicating signals, said first and third position indicating signals being separated by a first difference frequency and being radiated from one pair of said spaced apart points, said second and fourth position indicating signals being separated by a second difference frequency and being radiated from a second pair of said spaced apart points, means for heterodyning said first and third position indicating signals to produce said first difference frequency, means for modulating said second position indicating signal with a first reference signal derived from said first difference frequency, means for heterodyning the second and fourth position indicating signals in order to produce said second difference frequency, means for modulating said first position indicating signal with a reference signal derived from said second difference frequency, means at the mobile receiver unit for heterodyning said position indicating signals in pairs in order to develop said first and second difference frequencies and for detecting the first and second reference signals, means jointly responsive to the first reference signal and to the first difference frequency for providing a first indication representative of the location of the mobile receiver unit relative to said one pair of points, means jointly responsive to the second reference signal and to the second difference frequency for producing a second indication representative of the location of the mobile receiver unit relative to said second pair of points, means jointly responsive to the second reference signal and the second difference frequency for developing a first control signal, means for multiplying said first control signal by a factor dependent upon the ratio of the frequency of the first position indicating signal and the second difference frequency in order to develop a second control signal, means responsive to the second control signal for reducing or eliminating third frequency errors from said second indication, means responsive to the first reference signal and the first difference frequency for developing a third control signal, means for multiplying the third control signal by a factor dependent upon the ratio of the frequency of the second position indicating signal and the first difference frequency in order to develop a fourth control signal, and means responsive to said fourth control signal for reducing or eliminating third frequency errors from said first indication.

References Cited in the file of this patent

UNITED STATES PATENTS

| | | |
|---|---|---|
| 2,611,127 | Palmer | Sept. 16, 1952 |
| 2,651,032 | Torcheux | Sept. 1, 1953 |